United States Patent
Liang et al.

(10) Patent No.: US 12,311,266 B2
(45) Date of Patent: May 27, 2025

(54) METHOD AND APPARATUS FOR USING VIRTUAL PROP, DEVICE, AND STORAGE MEDIUM

(71) Applicant: TENCENT TECHNOLOGY (SHENZHEN) COMPANY LTD, Guangdong (CN)

(72) Inventors: Chao Liang, Shenzhen (CN); Zhihong Liu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 465 days.

(21) Appl. No.: 17/668,789

(22) Filed: Feb. 10, 2022

(65) Prior Publication Data

US 2022/0161138 A1  May 26, 2022

Related U.S. Application Data

(63) Continuation of application No. PCT/CN2020/129801, filed on Nov. 18, 2020.

(30) Foreign Application Priority Data

Jan. 21, 2020  (CN) .......................... 202010071034.5

(51) Int. Cl.
*A63F 13/56* (2014.01)
*A63F 13/537* (2014.01)

(52) U.S. Cl.
CPC ............ *A63F 13/56* (2014.09); *A63F 13/537* (2014.09)

(58) Field of Classification Search
CPC ................ A63F 13/537; A63F 13/5372; A63F 13/5375; A63F 13/5378; A63F 13/55;
(Continued)

(56) References Cited

U.S. PATENT DOCUMENTS

| 7,059,963 | B2 * | 6/2006 | Okamura | .............. A63F 13/812 463/3 |
| 7,559,834 | B1 * | 7/2009 | York | ....................... A63F 13/10 463/2 |

(Continued)

FOREIGN PATENT DOCUMENTS

| CN | 110585710 A | 12/2019 |
| CN | 110613938 A | 12/2019 |

(Continued)

OTHER PUBLICATIONS

Machine translation of CN 110613938 A, downloaded from https://worldwide.espacenet.com/, Mar. 18, 2024.*

(Continued)

*Primary Examiner* — Omkar A Deodhar
*Assistant Examiner* — Matthew D Hoel
(74) *Attorney, Agent, or Firm* — Banner & Witcoff, Ltd.

(57) ABSTRACT

Embodiments of the present disclosure include a method and apparatus for using a virtual prop, a device, and a storage medium, relating to supporting virtual environments. The method includes: displaying a user interface rom a first visual character's perspective; in response to a use instruction, controlling the first visual character to use a first virtual prop to generate a defense range an attack from another virtual prop; and intercepting the second virtual prop based on determining that the another virtual prop will likely fall within the defense range of the first virtual prop.

20 Claims, 11 Drawing Sheets

(58) Field of Classification Search
CPC ........ A63F 13/56; A63F 13/57; A63F 13/837;
A63F 13/426; A63F 13/533; A63F 13/573
See application file for complete search history.

(56) References Cited

U.S. PATENT DOCUMENTS

| | | | | |
|---|---|---|---|---|
| 7,594,847 | B1* | 9/2009 | York | A63F 13/48 463/2 |
| 7,690,992 | B2* | 4/2010 | Itou | A63F 13/56 463/31 |
| 7,980,949 | B2* | 7/2011 | Sakaguchi | A63F 13/10 463/30 |
| 8,702,513 | B2* | 4/2014 | Lim | G06F 3/04883 463/31 |
| 9,180,365 | B2* | 11/2015 | Torre | A63F 13/285 |
| 9,427,659 | B2* | 8/2016 | Ferguson | G08B 21/0261 |
| 9,457,276 | B2* | 10/2016 | Slaby | A63F 13/56 |
| 9,713,772 | B2* | 7/2017 | Frostberg | A63F 13/537 |
| 10,029,180 | B2* | 7/2018 | Yamagami | A63F 13/56 |
| 10,183,222 | B2* | 1/2019 | Tsui | A63F 13/837 |
| 10,335,689 | B2* | 7/2019 | Wada | A63F 13/537 |
| 10,343,073 | B2* | 7/2019 | Wada | A63F 13/822 |
| 10,453,305 | B2* | 10/2019 | Gilmore | G07F 17/3267 |
| 10,463,966 | B2* | 11/2019 | Fujiwara | A63F 13/822 |
| 10,967,280 | B2* | 4/2021 | Wada | A63F 13/822 |
| 11,052,312 | B2* | 7/2021 | Nishikawa | A63F 13/5378 |
| 11,071,915 | B2* | 7/2021 | Black | A63F 13/56 |
| 11,161,041 | B2* | 11/2021 | Deng | A63F 13/537 |
| 11,185,773 | B2* | 11/2021 | Huang | A63F 13/537 |
| 11,198,066 | B2* | 12/2021 | Yu | A63F 13/5378 |
| 11,278,809 | B2* | 3/2022 | Takafuji | A63F 13/577 |
| 11,351,457 | B2* | 6/2022 | Huang | A63F 13/5372 |
| 11,376,497 | B2* | 7/2022 | Wang | A63F 13/35 |
| 11,400,374 | B2* | 8/2022 | Chen | A63F 13/58 |
| 11,460,697 | B2* | 10/2022 | Muramoto | A63F 13/25 |
| 11,491,405 | B2* | 11/2022 | Wada | A63F 13/56 |
| 11,612,809 | B2* | 3/2023 | Nakamura | A63F 13/2145 463/31 |
| 11,638,874 | B2* | 5/2023 | Lutz | A63F 13/57 463/31 |
| 11,691,079 | B2* | 7/2023 | Huang | A63F 13/5258 463/31 |
| 11,701,588 | B2* | 7/2023 | Fukada | A63F 13/422 463/31 |
| 11,714,281 | B2* | 8/2023 | Muramoto | G06F 3/012 345/8 |
| 11,724,181 | B2* | 8/2023 | Nishikawa | A63F 13/56 463/31 |
| 11,794,107 | B2* | 10/2023 | Kutcher | A63F 13/56 |
| 11,833,426 | B2* | 12/2023 | Liu | A63F 13/837 |
| 11,865,449 | B2* | 1/2024 | Wei | A63F 13/56 |
| 11,890,541 | B2* | 2/2024 | Hu | A63F 13/426 |
| 11,890,542 | B2* | 2/2024 | Wan | A63F 13/537 |
| 11,925,865 | B2* | 3/2024 | Yamamura | A63F 13/537 |
| 2007/0243914 | A1* | 10/2007 | Yan | A63H 30/04 463/2 |
| 2022/0040574 | A1* | 2/2022 | Li | A63F 13/422 |

FOREIGN PATENT DOCUMENTS

| | | |
|---|---|---|
| CN | 111298441 A | 6/2020 |
| JP | 3181808 B2 | 7/2001 |
| JP | 2011-215886 A | 10/2011 |

OTHER PUBLICATIONS

International Search Report for PCT/CN2020/129801, dated Feb. 20, 2021.
Written Opinion for PCT/CN2020/129801, dated Feb. 20, 2021.

* cited by examiner

METHOD AND APPARATUS FOR USING VIRTUAL PROP, DEVICE, AND STORAGE MEDIUM

CROSS-REFERENCE TO RELATED APPLICATION(S)

This application is a continuation application of International Application No. PCT/CN2020/129801, filed Nov. 18, 2020, which claims priority to Chinese Patent Application No. 202010071034.5, filed with the China National Intellectual Property Administration on Jan. 21, 2020, the disclosures of which are incorporated by reference in their entireties.

FIELD

Embodiments of the present disclosure relate to the field of applications supporting virtual environments, and in particular, to a method and apparatus for using a virtual prop, a device, and a storage medium.

BACKGROUND

In an application based on a three-dimensional (3D) virtual environment, for example, a first-person shooting (FPS) game, a virtual character may use a chasing-type virtual weapon to attack a hostile virtual character. For example, the virtual character may use weapons like a missile to lock and track one or more hostile virtual characters, and then attack the hostile virtual characters.

In related art, a user may control a virtual character to move for evasion, such as staying away from a chasing range of the virtual weapon, or hiding in a house to reduce damage.

SUMMARY

Embodiments of the present disclosure provide a method and apparatus for using a virtual prop, a device, and a storage medium, to provide a first virtual prop specially for intercepting other virtual props, thereby preventing a user from spending an excessively long time evading a chasing weapon, and improving the man-machine interaction efficiency. The technical solutions are as follows:

According to an aspect of the present disclosure, a method for using a virtual prop is provided, including:
displaying a first user interface (UI), the first UI including a first virtual environment image, the first virtual environment image being an image obtained by observing a virtual environment from a perspective of a first virtual character;
controlling, in response to a use instruction for a first virtual prop, the first virtual character to use the first virtual prop, the first virtual prop being a virtual prop used for generating a defense range, the defense range being a range in which the first virtual prop is capable of producing a defense effect against an attack from a second virtual prop, the second virtual prop having a function of chasing a target virtual character; and
intercepting the second virtual prop based on determining that the second virtual prop will fall within the defense range.

According to another embodiment of the present disclosure, an apparatus for using a virtual prop is provided, the apparatus comprising at least one memory configured to store program code; and at least one processor configured to read the program code and operate as instructed by the program code, the program code comprising:
displaying code configured to cause the at least one processor to display a first UI, the first UI including a first virtual environment image, the first virtual environment image being an image obtained by observing a virtual environment from a perspective of a first virtual character;
controlling code configured to cause the at least one processor to control, in response to a use instruction for a first virtual prop, the first virtual character to use the first virtual prop, the first virtual prop being a virtual prop used for generating a defense range, the defense range being a range in which the first virtual prop is capable of producing a defense effect against an attack from a second virtual prop, the second virtual prop having a function of chasing a target virtual character; and
the controlling code further configured to cause the at least one processor to intercept the second virtual prop based on determining that the second virtual prop will fall within the defense range.

According to another aspect of the present disclosure, a computer device is provided, including a processor and a memory, the memory storing at least one computer program, the at least one computer program being loaded and executed by the processor to perform the method for using a virtual prop described in the foregoing aspects.

According to another embodiment of the present disclosure, a non-transitory computer-readable storage medium is provided, storing at least one computer program, the at least one computer program executable by a processor and configured to perform the method for using a virtual prop described in embodiments of the present disclosure.

According to another aspect, a computer program product or a computer program is provided, including computer program code, the computer program code being stored in a computer-readable storage medium. A processor of an electronic device reads the computer program code from the computer-readable storage medium, and executes the computer program code, so that the electronic device performs the method for using a virtual prop provided in embodiments of the present disclosure.

The technical solutions provided in the embodiments of the present disclosure achieve at least the following beneficial effects:

By providing a first virtual prop specially for intercepting other virtual props, when a virtual character uses the first virtual prop to a chasing-type virtual weapon, the virtual weapon is intercepted within a defense range, so that a user does not need to evade the virtual weapon through a long-time movement, preventing the user from spending an excessively long time evading the chasing-type weapon. Further, because the user does not need to trigger a movement control for a long time to evade the virtual weapon, the possibility of the user making a mistake is reduced, and the user's operation accuracy improves. With improved operation accuracy, the user has a higher with respect to a first virtual character. Further, since the computer does not need to compute real-time positions of the virtual props for a long time, computing resources are saved and optimally used. In addition, because an operation process of triggering the first virtual prop is relatively simple, the man-machine interaction efficiency also improves.

BRIEF DESCRIPTION OF THE DRAWINGS

To describe the technical solutions in embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

Figure 1:
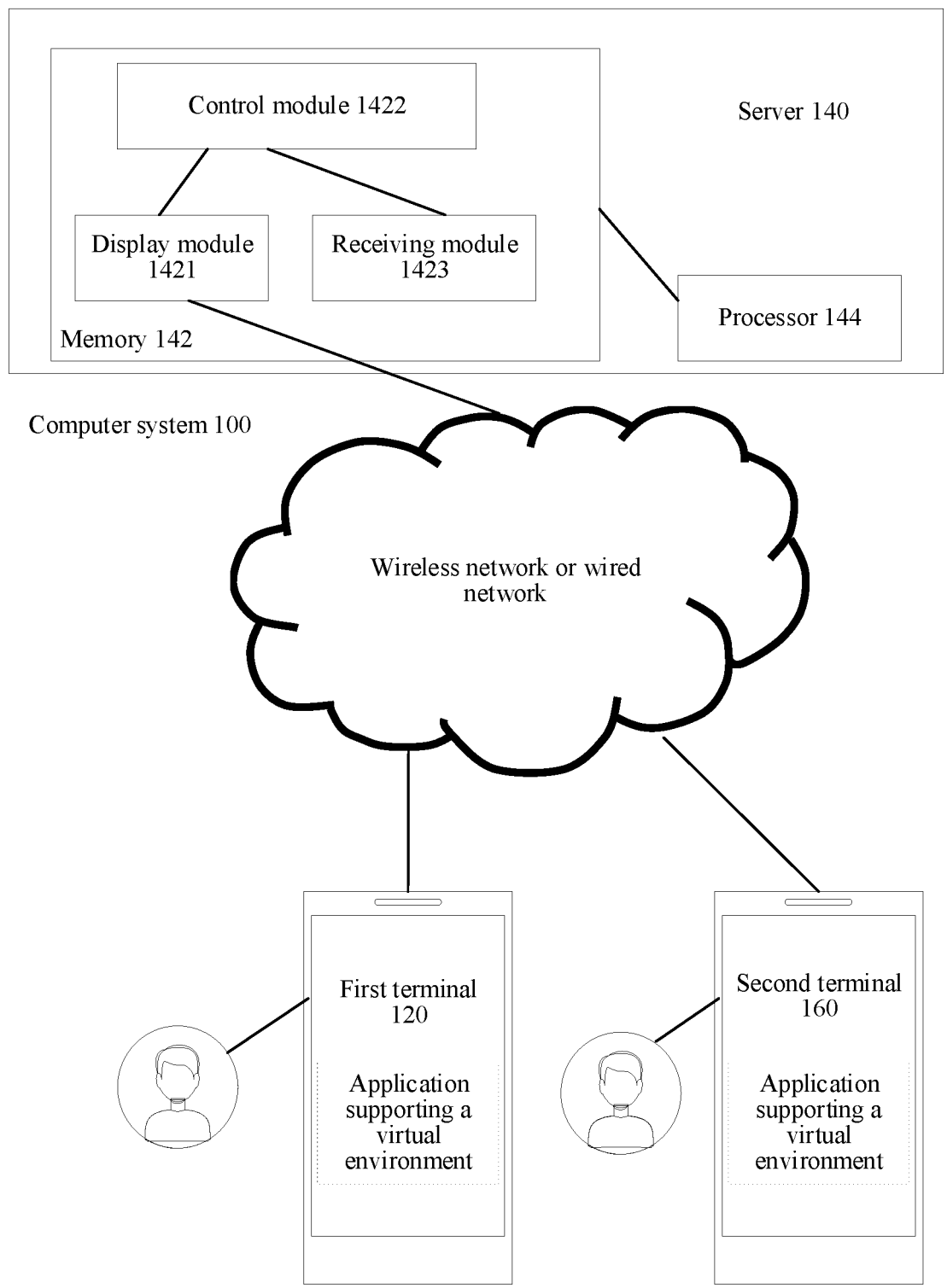
FIG. 1 is a block diagram of an implementation environment according to an exemplary embodiment of the present disclosure.

To make objectives, technical solutions, and advantages of the embodiments of the present disclosure clearer, the following further describes implementations of the present disclosure in detail with reference to the accompanying drawings.

In the related art, after being attacked by a chasing-type virtual weapon, a user needs to trigger a movement control in real time and control a virtual character to evade, so as to reduce damage caused by the virtual weapon. The operations are excessively complex and the man-machine interaction speed and efficiency is excessively low.

For ease of understanding, terms involved in the embodiments of the present disclosure are introduced:

Virtual environment: It is a virtual environment displayed (or provided) by an application when run on a terminal. The virtual environment is a simulated environment of a real world, or a semi-simulated and semi-fictional environment, or a completely fictional environment. In some embodiments, the virtual environment is any one of a two-dimensional virtual environment, a 2.5-dimensional virtual environment, and a 3D virtual environment. This is not limited in the embodiments of the present disclosure. A description is made by using an example in which the virtual environment is a 3D virtual environment in the following embodiments.

Virtual character: It is a movable object in a virtual environment. The movable object is a virtual person, a virtual animal, a cartoon person, or the like, such as a person, an animal, a plant, an oil drum, a wall, a stone, or the like displayed in a 3D virtual environment. In some embodiments, the virtual character is a 3D model created based on a skeletal animation technology. Each virtual character has a respective shape and size in the 3D virtual environment, and occupies some space in the 3D virtual environment.

Virtual prop: A virtual prop includes at least one of a virtual weapon, a functional prop, and virtual equipment. The virtual prop in some embodiments of the present disclosure is a virtual weapon, and the virtual weapon is a weapon that can be used by a virtual character in a virtual environment. The virtual weapon is a prop that will affect an activity state or hit points of another virtual character after being used by a virtual character. Virtual weapons include cold weapons, firearms, artillery, armored combat vehicles, anti-riot weapons, biochemical weapons, nuclear weapons, new concept weapons, and the like. For example, a virtual prop is a knife, a gun, a sword, a pistol, a rifle, a submachine gun, a machine gun, a special gun, a shotgun, a grenade, a rocket, a mortar, a tank gun, a cannon, a missile, a laser weapon, a microwave weapon, a particle beam weapon, a kinetic energy interceptor, an electromagnetic gun, a pulse weapon, a signal jamming weapon, or the like. A first virtual prop in the embodiments of the present disclosure is an interference-type virtual weapon, for example, an anti-tracking missile. A second virtual prop in the embodiments of the present disclosure is a chasing-type virtual weapon, for example, a missile.

First-person shooting (FPS) game: It is a game, for example, a shooting game in which a user can play from a first-person perspective. A virtual environment image (or a virtual environment picture) in the game is an image obtained by observing a virtual environment from a perspective of a first virtual character. In the game, at least two virtual characters play in a single-round battle mode in the virtual environment. The virtual character evades attacks from other virtual characters and/or dangers (such as a poison gas area, a swamp, and a bomb) in the virtual environment to survive in the virtual environment. When the hit points of the virtual character in the virtual environment is zero, the life of the virtual character in the virtual environment ends, and the final virtual character surviving in the virtual environment wins. In some embodiments, a battle starts with a moment when a first client joins the battle, and ends with a moment when the last client exits the battle. Each client can control one or more virtual characters in the virtual environment. In some embodiments, arena modes of the battle include a single-player battle mode, a two-player team battle mode, or a multi-player team battle mode. The battle mode is not limited in the embodiments of the present disclosure.

Man-machine interaction control: It is any visual control or element that can be seen on a UI of an application, for example, a control such as a picture, an input box, a text box, a button, or a label. Some man-machine interaction controls respond to an operation of a user. For example, the user triggers and uses a control to control a first virtual character to use a first virtual prop.

In the embodiments of the present disclosure, when a virtual weapon is "equipped, carried, or assembled", it means that a virtual character owns the virtual weapon, or a virtual character owns an inventory with an inventory slot and the virtual weapon is stored in the inventory of the virtual character, or a virtual character is using the virtual weapon.

A method provided in the embodiments of the present disclosure is applied to a virtual reality (VR) application, a 3D map program, a military simulation program, an FPS game, a multiplayer online battle arena (MOBA) game, and the like. An application in a game is used as an example for description in the following embodiments.

A game based on a virtual environment usually includes maps of one or more game worlds. The virtual environment in the game simulates scenes in the real world. A user can control a virtual character in the game to perform actions in the virtual environment such as walking, running, jumping, shooting, combatting, driving, switching to props, and using a prop to attack another virtual character, which has relatively high interactivity. In addition, a plurality of users can form a team online to perform an arena game. When the virtual character controlled by the user attacks another virtual character (that is, a target object) in the virtual environment, and a distance from the virtual character to the target object is relatively long, the user can control the virtual character to use a chasing-type virtual prop (that is, a second virtual prop) to attack the target object. The chasing-type virtual prop can lock the target object, track the target object, move with the target object within a specific range until the target object is chased up, and attack the target object.

Hit points of the attacked target object are reduced or become zero, where hit points refer to a life length of a virtual character in the virtual environment, and when the hit points of the virtual character become zero, a life of the virtual character in the virtual environment ends; or magic points of the attacked target object are reduced or become zero; or the attacked target object is in a dizzy state; or attack power of the attacked target object is reduced; or defense power of the attacked target object is reduced.

There can be one or more target objects attacked by the chasing-type virtual prop.

FIG. 1 is a structural block diagram of a computer system according to an exemplary embodiment of the present disclosure. The computer system 100 includes a first terminal 120, a server 140, and a second terminal 160.

An application supporting a virtual environment is installed and run on the first terminal 120. The application is any one of a VR application, a 3D map application, a military simulation application, an FPS game, a MOBA game, and a multiplayer gunfight survival game. The first terminal 120 is a terminal used by a first user. The first user uses the first terminal 120 to control a first virtual character in a virtual environment to perform motions. The motions include, but are not limited to, at least one of body posture adjustment, crawling, walking, running, cycling, jumping, driving, shooting, throwing, using a virtual weapon to attack another virtual character, and using a virtual weapon to accumulate force to attack another virtual character. For example, the first virtual character is a first virtual person, such as a simulated person object or a cartoon person object.

The first terminal 120 is connected to the server 140 by using a wireless network or a wired network.

The server 140 includes at least one of one server, a plurality of servers, a cloud computing platform, and a virtualization center. For example, the server 140 includes a processor 144 and a memory 142. The memory 142 includes a display module 1421, a control module 1422, and a receiving module 1423. The server 140 is configured to provide a backend service for an application supporting a 3D virtual environment. In some embodiments, the server 140 takes on primary computing work, and the first terminal 120 and the second terminal 160 take on secondary computing work; or the server 140 takes on secondary computing work, and the first terminal 120 and the second terminal 160 take on primary computing work; or collaborative computing is performed by using a distributed computing architecture among the server 140, the first terminal 120, and the second terminal 160.

An application supporting a virtual environment is installed and run on the second terminal 160. The application is any one of a VR application, a 3D map application, a military simulation application, an FPS game, a MOBA game, and a multiplayer gunfight survival game. The second terminal 160 is a terminal used by a second user. The second user uses the second terminal 160 to control a second virtual character in the virtual environment to perform motions. The motions include, but are not limited to, at least one of body posture adjustment, crawling, walking, running, cycling, jumping, driving, shooting, throwing, using a virtual weapon to attack another virtual character, and using a virtual weapon to accumulate force to attack another virtual character. For example, the second virtual character is a second virtual person, such as a simulated person object or a cartoon person object.

In some embodiments, the first virtual person and the second virtual person are located in the same virtual environment.

In some embodiments, the applications installed on the first terminal 120 and the second terminal 160 are the same, or the applications installed on the two terminals are the same type of applications in different control system platforms. The first terminal 120 generally refers to one of a plurality of terminals, the second terminal 160 generally refers to one of a plurality of terminals, and an embodiment is described only by using the first terminal 120 and the second terminal 160 as an example. The first terminal 120 and the second terminal 160 are of the same device type or of different device types. The device type includes at least one of an augmented reality (AR) device, a VR device, a smart wearable device, a smartphone, a tablet computer, an e-book reader, a Moving Picture Experts Group Audio Layer III (MP3) player, a Moving Picture Experts Group Audio Layer IV (MP4) player, a laptop, and a desktop computer. The following embodiment is described by using an example in which the terminal includes a smartphone.

A person skilled in the art knows that, there can be more or fewer terminals. For example, there may be only one terminal, or there may be dozens of or hundreds of terminals. The quantity and the device type of the terminal are not limited in the embodiments of the present disclosure.

Figure 2:
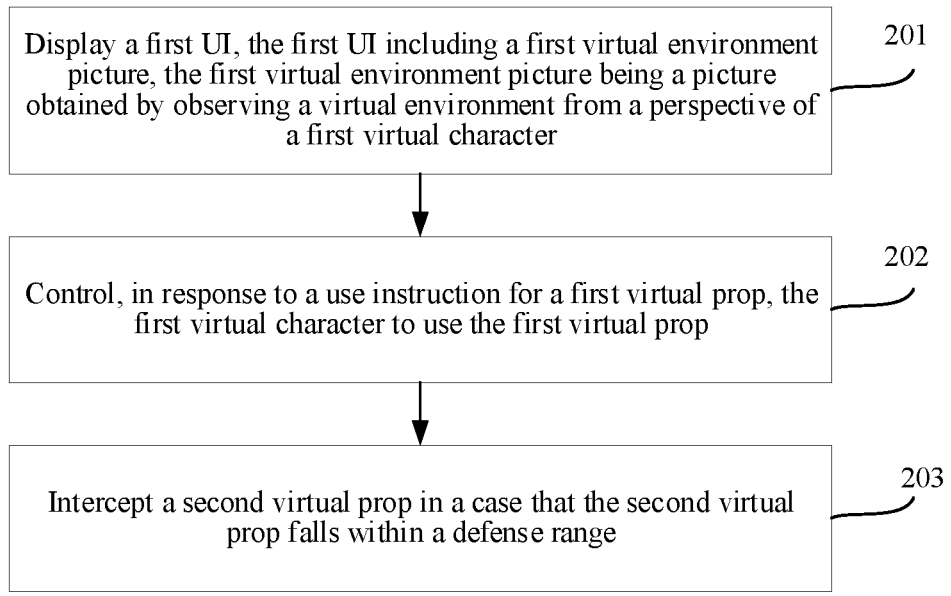
FIG. 2 is a flowchart of a method for using a virtual prop according to an exemplary embodiment of the present disclosure.

FIG. 2 is a flowchart of a method for using a virtual prop according to an exemplary embodiment of the present disclosure. The method may be implemented at the first terminal 120 or the second terminal 160 in the computer system shown in FIG. 1 or another terminal in the computer system. The method includes the following operations:

Operation 201: Display a first UI, the first UI including a first virtual environment image, the first virtual environment image being an image obtained by observing a virtual environment from a perspective of a first virtual character.

In some embodiments, the first UI is an interface displayed on a first client.

In some embodiments, the first virtual character is a movable object in the virtual environment. The movable object may be a virtual person, a virtual animal, a cartoon person, or the like, such as a person, an animal, a plant, an oil drum, a wall, a stone, or the like displayed in a 3D virtual environment. In some embodiments, the first virtual character is a 3D model created based on a skeletal animation technology. Each virtual character has a respective shape and size in the 3D virtual environment, and occupies some space in the 3D virtual environment.

In some embodiments, the first virtual environment image is an image obtained by observing the virtual environment from the perspective of the first virtual character;

In some embodiments, the perspective refers to an observation angle at which observation is performed in the virtual environment from a first-person perspective or a third-person perspective of the first virtual character. In the embodiments of the present disclosure, the perspective is an angle for observing the virtual character by using a camera model in the virtual environment.

In some embodiments, the camera model performs automatic following of the first virtual character in the virtual environment, that is, when the position of the first virtual character changes in the virtual environment, the camera model changes relative to and at the same time as the position of the first virtual character in the virtual environment, and the camera model is always located in a preset distance range of the first virtual character in the virtual environment. In some embodiments, in the automatic following process, relative positions of the camera model and the first virtual character remain unchanged.

The camera model is a 3D model located around the first virtual character in the virtual environment; when a first-person perspective is adopted, the camera model is located around the head of the first virtual character or located at the head of the first virtual character; when a third-person perspective is adopted, the camera model is located behind the first virtual character and bound to the first virtual character, or is located at any position away from the first virtual character by a preset distance, and the first virtual character located in the virtual environment can be observed from different angles by means of the camera model. In some embodiments, when the third-person perspective is a first-person over-shoulder perspective, the camera model is located behind the first virtual character (for example, the head and the shoulders of a virtual person). In some embodiments, in addition to the first-person perspective and the third-person perspective, the perspective also includes other perspectives, such as a top perspective. When the top perspective is used, the camera model is located above the head of the first virtual character. The top perspective is a perspective for observing the virtual environment with an angle from the sky. In some embodiments, the camera model is not actually displayed in the virtual environment. In other words, the camera model is not displayed in the virtual environment displayed in the UI.

Description is made by using an example in which the camera model is located at any position away from the first virtual character by a preset distance. In some embodiments, one virtual character corresponds to one camera model, and the camera model is rotated with the first virtual character as a rotation center. For example, the camera model is rotated with any point of the first virtual character as the rotation center. During rotation, the camera model is not only rotated, but also displaced. During rotation, a distance between the camera model and the rotation center remains unchanged, that is, the camera model is rotated on a surface of a sphere with the rotation center as a sphere center. Any point of the first virtual character is the head or the torso of the first virtual character, or any point around the first virtual character. This is not limited in the embodiments of the present application. In some embodiments, when the first virtual character is observed by using the camera model, the center direction of the perspective of the camera model is a direction in which a point of a spherical surface on which the camera model is located points to the sphere center.

In some embodiments, the camera model may further observe the first virtual character from different directions of the first virtual character at a preset angle.

Figure 3:
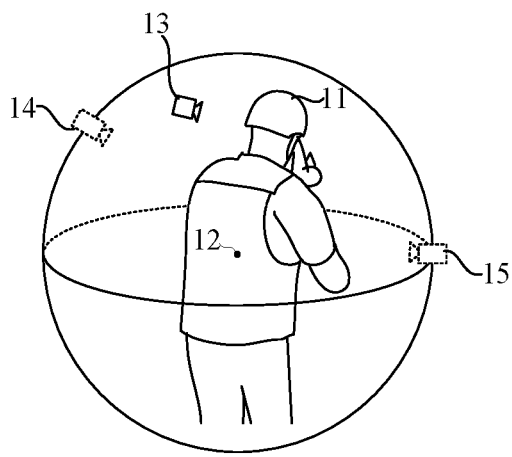
FIG. 3 is a schematic diagram of a camera model corresponding to a perspective of a virtual character according to an exemplary embodiment of the present disclosure.

For example, referring to FIG. 3, a point in a first virtual character 11 is determined as a rotation center 12, and the camera model is rotated around the rotation center 12. In some embodiments, the camera model is configured with an initial position, and the initial position is an upper rear position of the first virtual character (for example, a rear position of the brain).

In some embodiments, the virtual environment displayed on the first virtual environment image includes at least one of the following elements: a mountain, a plain, a river, a lake, a sea, a desert, sky, a plant, a building, and a vehicle.

In some embodiments, the first virtual character is a virtual character that owns or has access to the first virtual prop. The first virtual prop is a firearm, such as a sniper rifle, a rifle, a pistol, a bow and arrow, or a bolt; or the first virtual prop is an equipment prop, such as armor, a balloon, a backpack, or a watch; or the first virtual prop is a throw prop, such as a grenade, a flash bomb, a flare bomb, a pulse bomb, a pan, or a missile. In some embodiments, the first virtual character is a virtual character controlled by the first client installed on the first terminal. In some embodiments, the first virtual character is controlled by a first user that uses the first terminal.

For example, the first virtual prop is a handheld throw prop (an anti-tracking missile). The first user can control, in one of the following manners, the first virtual character to equip the first virtual prop to a throw prop equipment bar: triggering an equipment switching control on the first UI, and selecting the first virtual prop from a plurality of candidate throw props; or triggering an equipment control on the throw prop equipment bar to directly switch another throw prop to the first virtual prop.

Figure 4:
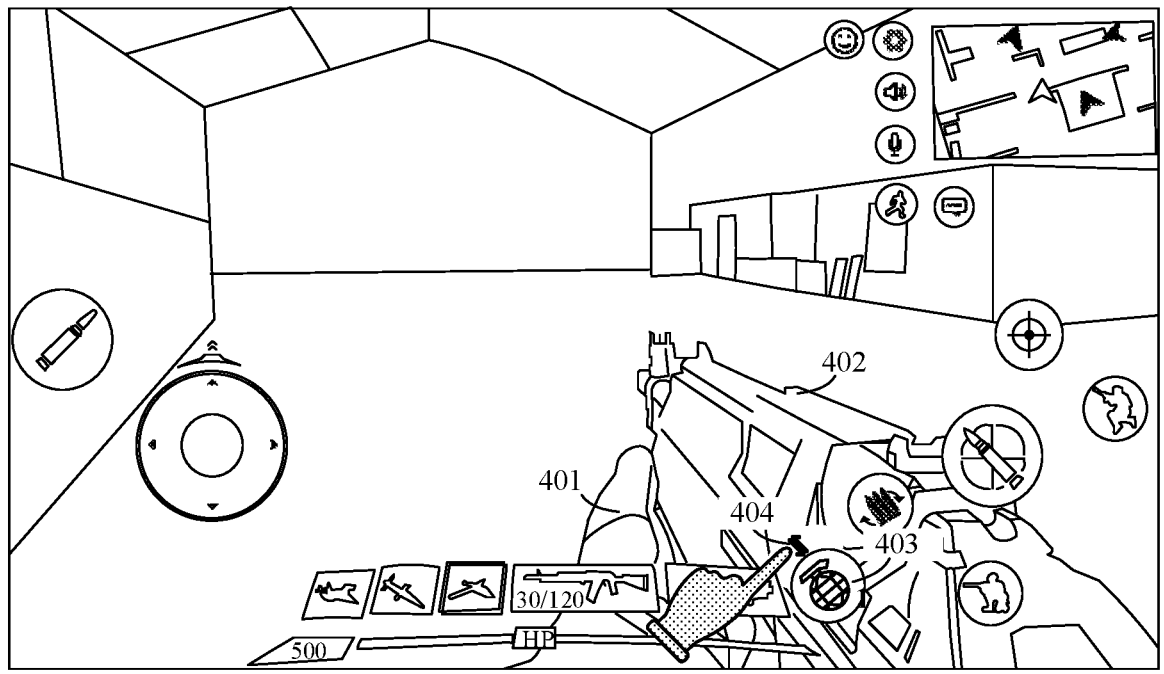
FIG. 4 is a schematic diagram of a UI in a method for using a virtual prop according to an exemplary embodiment of the present disclosure.

FIG. 4 illustrates a first UI according to embodiments of the present disclosure. The first UI includes a first image (or first picture). The first image is obtained by observing the virtual environment from a first-person perspective of the first virtual character. The first image only displays a part of the model of the first virtual character: a hand 401. The first virtual character owns a first virtual prop: an anti-tracking missile, but the first virtual character in a current state holds a machine gun 402. A throw prop equipment bar 403 is equipped with a throw prop: a smoke bomb. In this case, the first user can display the first virtual prop (anti-tracking missile) in the throw prop equipment bar 403 through a switching operation for an equipment prop. For example, the switching operation such as an equipment switching control 404 on the first UI is triggered, to control a throw prop equipment alternative bar 405 shown in FIG. 5 to pop up in the first UI, and a first virtual prop (anti-tracking missile) 406 is selected in the throw prop equipment alternative bar 405, to control the first virtual character to display the first virtual prop (anti-tracking missile) 406 in the throw prop equipment bar 403. As shown in FIG. 6, the first virtual prop (anti-tracking missile) 406 is displayed in the throw prop equipment bar 403.

In some embodiments, the first user can further trigger an equipment control on the throw prop equipment bar 403 to control the first virtual character to be equipped with a current throw prop. For example, as shown in FIG. 6, the current throw prop in the throw prop equipment bar 403 is the first virtual prop (anti-tracking missile) 406, and the first user triggers the equipment control 407 to control the first virtual character to be equipped with the first virtual prop. After the first virtual character is equipped with the first virtual prop, the hand 401 holds the first virtual prop (anti-tracking missile) 406. This above-mentioned embodiment is an exemplary embodiment implementing a method for performing a switching operation by using a UI control on the UI.

The above-mentioned switching operation may be alternatively implemented in another manner on another UI, for example, by using an operation handle of a game device, through gesture or action recognition of an AR device or a VR device, or through an operation on a keyboard, a mouse or another input device.

Figure 5:
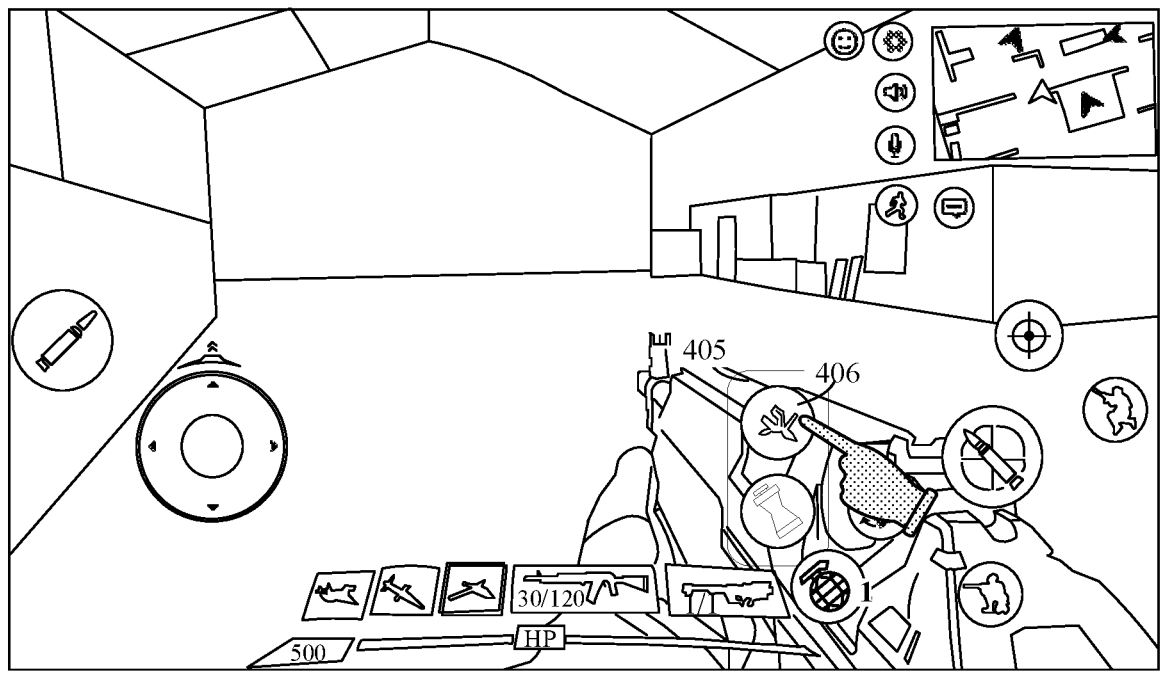
FIG. 5 is a schematic diagram of a UI in a method for using a virtual prop according to another exemplary embodiment of the present disclosure.
Figure 6:
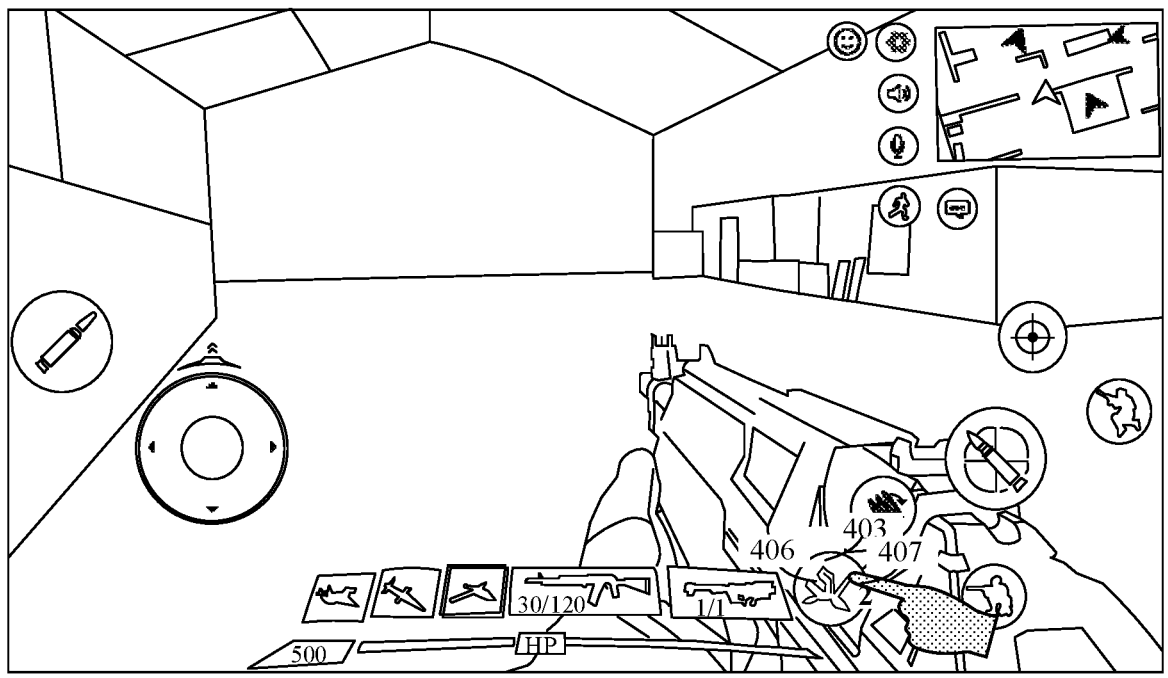
FIG. 6 is a schematic diagram of a UI in a method for using a virtual prop according to another exemplary embodiment of the present disclosure.

In some embodiments, the UIs shown in FIG. 4, FIG. 5, and FIG. 6 are all the first UI.

In some embodiments, the first virtual prop is picked up by the first virtual character from the virtual environment after a battle is entered; or the first virtual prop is equipped in advance before the battle is entered.

For example, during a shooting game, before entering a battle, a virtual character carries some equipment to enter the battle. In some embodiments, the equipment carried by the virtual character is tactical equipment. Tactical equipment refers to a tactical prop applied in a virtual scene. The tactical equipment is generally set to be non-aggressive, and is usually set as a defense apparatus or an interference apparatus, for example, a smoke bomb. When being used, the smoke bomb can produce a large amount of smoke to interfere with a line of sight of the enemy, so as to achieve the purpose of protecting the virtual character.

Figure 7:
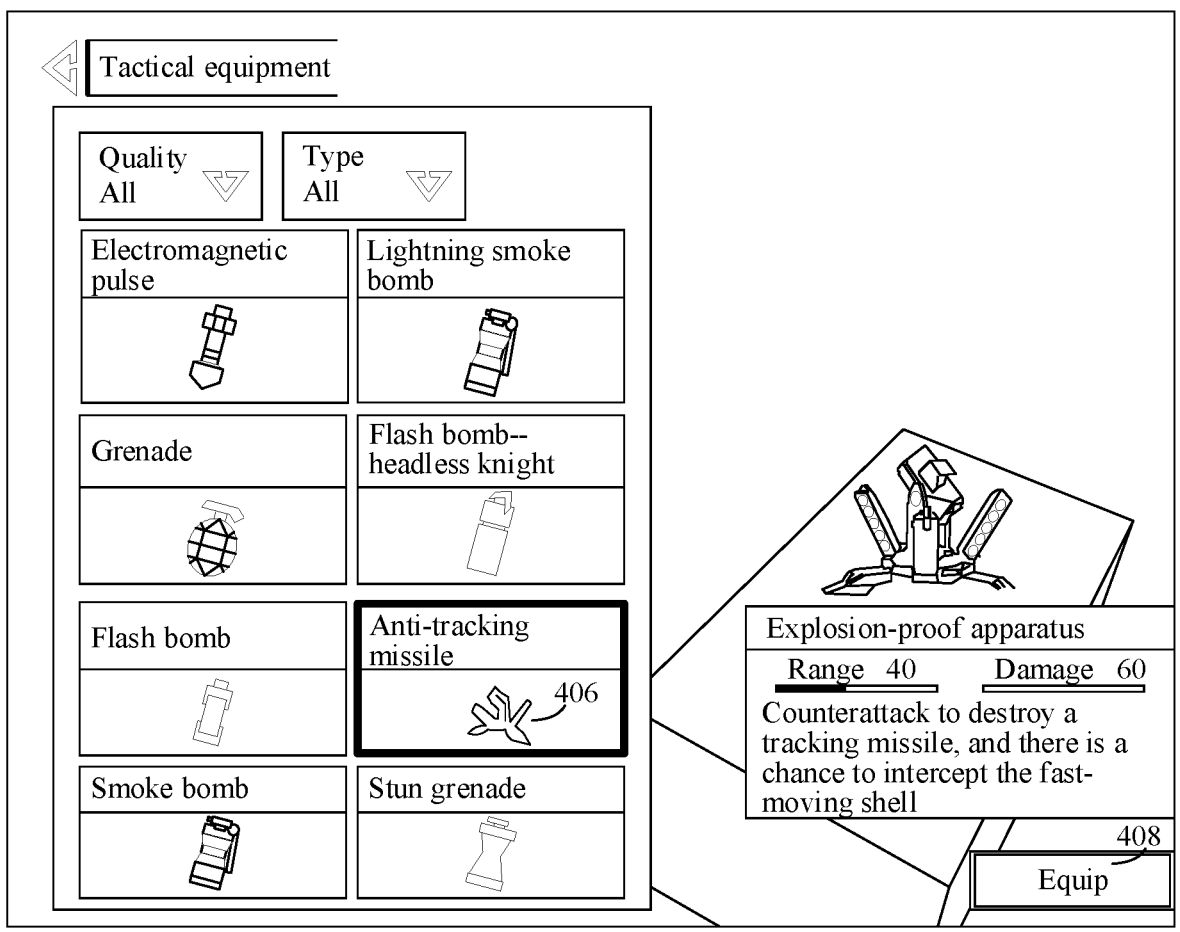
FIG. 7 is a schematic diagram of a UI in a method for using a virtual prop according to another exemplary embodiment of the present disclosure.

As shown in FIG. 7, the first user selects the first virtual prop (anti-tracking missile) 406 on a tactical equipment interface, and then clicks Equip 408, to equip the first virtual prop (anti-tracking missile) 406. After a battle is entered, the first virtual prop (anti-tracking missile) 406 is directly placed in an inventory or equipment bar of the first virtual character, and does not need to be picked up from the virtual environment or obtained during the battle.

Operation 202: Control, in response to a use instruction for a first virtual prop, the first virtual character to use the first virtual prop.

The first virtual prop is a virtual prop used for generating a defense range, the defense range is a range in which the first virtual prop is capable of producing a defense effect against an attack from a second virtual prop, and the second virtual prop has a function of chasing a target virtual character.

The target virtual character is a virtual character that is locked and chased by the second virtual prop. The quantity of target virtual characters is not limited in the present disclosure. The second virtual prop chases one virtual character, or a plurality of hostile virtual characters.

The first virtual prop in an embodiment of the present disclosure is an interference-type virtual weapon, for example, an anti-tracking missile. For example, the second virtual prop in an embodiment of the present disclosure is a chasing-type virtual weapon, for example, a missile.

In an embodiment of the present disclosure, an action effect produced by an attack from the second virtual prop to the first virtual character is one or more of limiting activities of the first virtual character, reducing health points of the first virtual character, reducing magic points of the first virtual character, reducing attack power of the first virtual character, reducing defense power of the first virtual character, or making the first virtual character dizzy.

In some embodiments, after the first virtual prop intercepts the second virtual prop, a produced defense effect is that the first virtual prop causes the action effect produced by the attack from the second virtual prop to be a complete failure; or the first virtual prop causes the action effect produced by the attack from the second virtual prop to be a partial failure.

In response to a use instruction for the first virtual prop, the first client controls the first virtual character to use the first virtual prop. The use instruction for the first virtual prop is generated after the first client obtains a trigger operation of the first user; or the use instruction for the first virtual prop is generated by the first client; or the use instruction for the first virtual prop is sent by a server to the first client.

In some embodiments, the use instruction for the first virtual prop includes a use manner of the first virtual prop, for example, a use time, a use location, a quantity for use, a use target, a use direction, a use force, and a use distance of the first virtual prop. The first client controls, according to the use instruction for the first virtual prop, the first virtual character to use the first virtual prop.

In some embodiments, the use instruction for the first virtual prop is generated after the first client obtains a trigger operation of the first user. The trigger operation is that the first user triggers a UI control on the first UI, and is, for example, a gesture or action operation of the first user, or a voice instruction of the first user, or a control operation performed by the first user by using an input device such as a keyboard, a game handle, or a mouse.

A specific operation of triggering the UI control on the first UI by the first user is not limited in the above-mentioned embodiment of the present disclosure. For example, the operation may be a click, a double-click, a long press, a slide, a press, or a knock.

In some embodiments, the first client can generate a use instruction for the first virtual prop by recognizing a gesture or action operation. In some embodiments, the gesture or action operation is in a VR environment or in an AR environment.

For example, the first client recognizes a throwing action performed by the first user, and generates a use instruction for the first virtual prop. In some embodiments, the first client can further recognize a voice instruction sent by the first user to generate a use instruction for the first virtual prop. For example, after recognizing "Throw in the direction of 1 o'clock" spoken by the first user, the first client generates a use instruction for the first virtual prop.

Operation 203: Intercept the second virtual prop when the second virtual prop falls within the defense range.

In some embodiments, a function of the first virtual prop is to intercept the second virtual prop. The function of the first virtual prop is effective within the defense range.

In some embodiments, after the first virtual prop is placed in a virtual scene, the function of the first virtual prop takes effect on a second virtual prop that falls within the defense range. For example, the function of the first virtual prop is to intercept a second virtual prop located within the defense range of the first virtual prop, so that the first client obtains the defense range of the first virtual prop, to determine, according to the defense range of the first virtual prop and a relationship between the second virtual prop and the defense range of the first virtual prop, whether to intercept the second virtual prop.

Based on the above, according to the method provided in an embodiment, by providing a first virtual prop specially for intercepting other virtual props, when a virtual character uses the first virtual prop to a chasing-type virtual weapon, the virtual weapon is intercepted within a defense range, so that a user does not need to evade the virtual weapon through a long-time movement, preventing the user from spending an excessively long time evading the chasing-type weapon, and improving the man-machine interaction efficiency.

Figure 8:
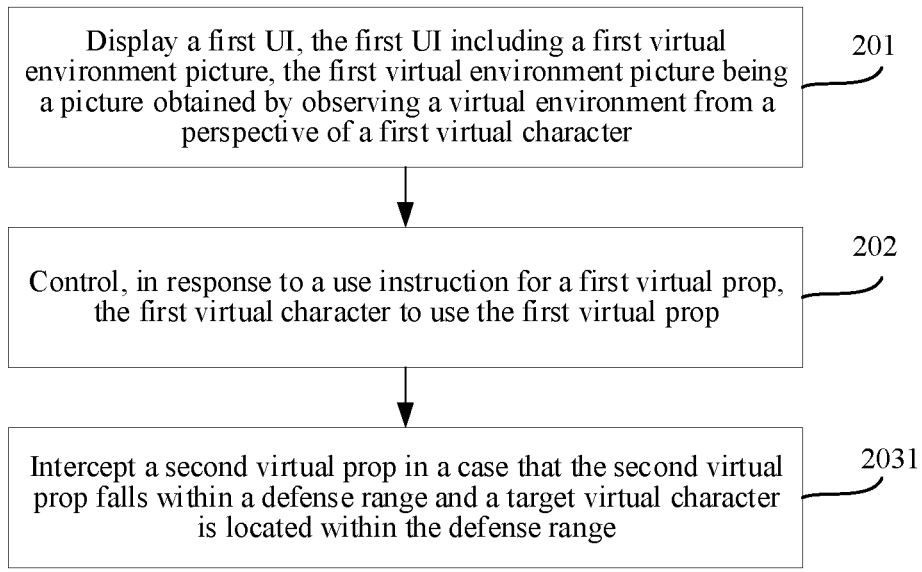
FIG. 8 is a flowchart of a method for using a virtual prop according to another exemplary embodiment of the present disclosure.

In an embodiment based on FIG. 2, FIG. 8 is a flowchart of a method for using a virtual weapon by a virtual character according to an exemplary embodiment of the present disclosure. The method is applicable to the first terminal 120 or the second terminal 160 in the computer system shown in FIG. 1 or another terminal in the computer system. A first client of an application supporting a virtual environment is installed on the terminal. In this embodiment, operation 203 is replaced and implemented by operation 2031.

Operation 2031: Intercept the second virtual prop when the second virtual prop falls within the defense range and the target virtual character is located within the defense range.

The target virtual character is at least one of the first virtual character and a second virtual character, the second virtual character and the first virtual character belonging to a same team.

In some embodiments, the target virtual character is a virtual character locked and chased by the second virtual prop. The second virtual character is a virtual character in the virtual environment that belongs to a same team as the first virtual character. The quantity of second virtual characters is not limited in the present disclosure. There may be one or more second virtual characters belonging to the same team as the first virtual character.

In some embodiments, the second virtual prop attacks the first virtual character. There is a first virtual character controlled by the first user within the defense range of the first virtual prop, and when the first client detects that the second virtual prop will fall within the defense range, the first client intercepts the second virtual prop.

In some embodiments, the second virtual prop attacks the second virtual character. There is a second virtual character controlled by another user within the defense range of the first virtual prop, and when the first client detects that the second virtual prop will fall within the defense range, the first client intercepts the second virtual prop.

In some embodiments, the second virtual prop attacks the first virtual character and the second virtual character. There is a first virtual character controlled by the first user (or a second virtual character controlled by another user) within the defense range of the first virtual prop, and when the first client detects that the second virtual prop will fall within the defense range, the first client intercepts the second virtual prop.

In some embodiments, the first virtual prop is an air defense prop. In addition to being capable of intercepting the second virtual prop, the first virtual prop can also protect a target virtual character within the defense range of the first virtual prop from being attacked by airborne virtual ammunition outside the defense range of the first virtual prop.

In some embodiments, a manner of intercepting the second virtual prop is: destroying the second virtual prop; or controlling the first virtual prop to launch a third virtual prop to shoot the second virtual prop down.

The first client can destroy the second virtual prop or launch a third virtual prop to shoot the second virtual prop down. In some embodiments, the third virtual prop is a virtual prop that is launched by the first virtual prop and has specific attack power. The third virtual prop is one of a bow and arrow, virtual ammunition, a grenade, a pan, or a missile.

In some embodiments, the defense range includes a space range with a distance to a placement point of the first virtual prop less than an effective radius. Before the intercepting the second virtual prop when the second virtual prop falls within the defense range, the method further includes the following operations:

obtaining, by the first client, a position of the second virtual prop in a release process; determining, when a distance between the placement point of the first virtual prop and the position of the second virtual prop is less than or equal to the effective radius, that the second virtual prop falls within the defense range.

The placement point is a point in the virtual environment, and the placement point corresponds to a unique coordinate in the virtual environment. The effective radius is a longest distance for which the first virtual prop can produce a defense effect.

In some embodiments, the placement point is a point selected by the first user, or the placement point is a point calculated by the first client based on an operation of the first user using the first virtual prop; or the placement point is a point calculated by the first client according to a perspective of the first virtual character at a current position.

In the above-mentioned embodiment of the present disclosure, the defense range of the first virtual prop is shown as a sphere with the placement point of the first virtual prop as a center and the effective radius as a radius.

Figure 9:
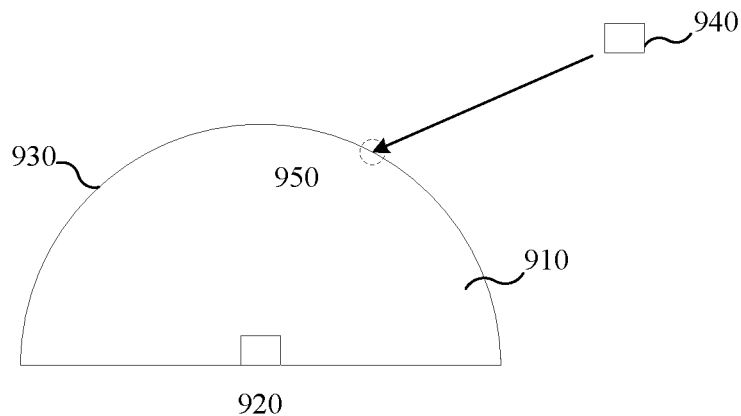
FIG. 9 is a schematic diagram of a defense range of a first virtual prop according to an exemplary embodiment of the present disclosure.

For example, FIG. 9 is a schematic diagram of a defense range of a first virtual prop according to an exemplary embodiment of the present disclosure. A region 910 is a defense range of a first virtual prop 920, and an edge 930 is an edge of the defense range of the first virtual prop 920. When a second virtual prop 940 passes through the defense range of the first virtual prop 920, there is an intersection 950 between the second virtual prop 940 and the region 910 at the edge 930. When the second virtual prop 940 is in contact with or is within the defense range of the first virtual prop 920 at the edge 950, the first client controls the second virtual prop 940 to be destroyed through explosion, to achieve an objective of protecting a target virtual character within the defense range of the first virtual prop 920.

In some embodiments, to determine the defense range of the first virtual prop, the first client can place the first virtual prop at a placement point in the virtual scene, then obtain coordinates of the placement point, determine the coordinates of the placement point as a first position, and determine a sphere with the first position as a center and an effective radius as a radius as the defense range.

The first client can obtain coordinates of the second virtual prop in a world coordinate system of the virtual scene in a release process, and determine the position as a second position. After the first client determines that a second virtual prop in a release process exists in the virtual environment, the first client calculates a distance between the first position and the second position, and determines, when the distance is less than or equal to the effective radius, that the second virtual prop falls within the defense range.

According to embodiments, the defense effect of the first virtual prop is also applicable to a teammate (that is, a second virtual character) of the first virtual character, thereby expanding the use manners of the first virtual prop.

According to the methods provided in example embodiments in the present disclosure, the use manners of the first virtual prop are further enriched through interception expansion.

According to the methods provided in the present disclosure, by obtaining a distance between the first virtual prop and the second virtual prop to determine whether the second virtual prop falls within the defense range of the first virtual prop, situations where the second virtual prop is not properly intercepted are reduced, and situations wherein the second virtual prop is intercepted by mistake are prevented. Thus, the accuracy and efficiency of the interception improves. Additionally, since real-time positions of the virtual props need not be calculated for a long time, computing resources are efficiently used.

In an example embodiment of the present disclosure, the first virtual prop needs to be placed according to an operation of the first user, and the placement point of the first virtual prop is controlled by the operation of the first user. Therefore, the first virtual prop may be configured with a launch prop, for the first user to adjust the placement point of the first virtual prop.

Figure 10:
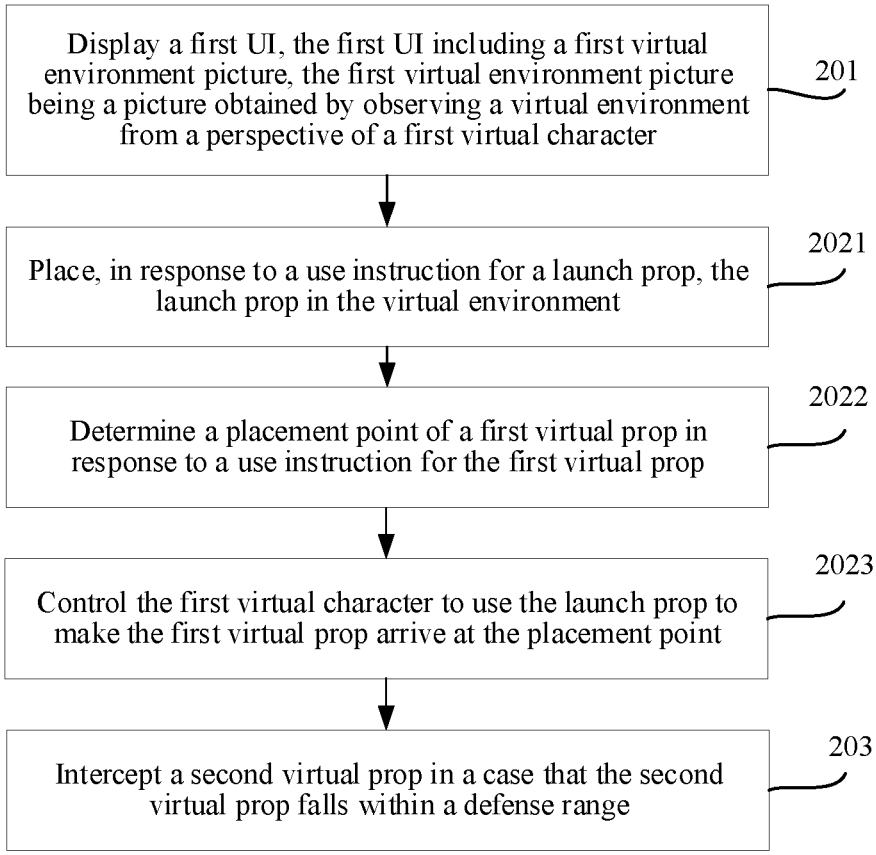
FIG. 10 is a flowchart of a method for using a virtual prop according to another exemplary embodiment of the present disclosure.

In an embodiment based on FIG. 2, FIG. 10 is a flowchart of a method for using a virtual prop according to an exemplary embodiment of the present disclosure. The method for using a virtual prop is performed by a computer device. The computer device is a terminal or server. The terminal may be a notebook computer, a tablet computer, a desktop computer, a set-top box or a mobile device (for example, a mobile phone, a portable music player, a personal digital assistant (PDA), a dedicated messaging device, or a portable game device), an on-board computer, or another type of user terminal. In an embodiment, operation 202 is replaced and implemented by operation 2021 to operation 2023:

Operation 2021: Place, in response to a use instruction for a launch prop, the launch prop in the virtual environment.

The launch prop is a virtual prop used for launching the first virtual prop.

In some embodiments, the first virtual prop and the corresponding launch prop need to be equipped according to an operation of the first user before the first virtual character enters the virtual environment, so that after the first virtual character enters the virtual environment, the first user can invoke the launch prop and use the first virtual prop.

In some embodiments, the use instruction for the launch prop is generated after the first client obtains a trigger operation of the first user. The trigger operation is that the first user triggers a UI control on the first UI, or is a gesture or action operation of the first user, or a voice instruction of the first user, or a control operation performed by the first user by using an input device such as a keyboard, a game handle, or a mouse. By providing a plurality of triggering manner, the user can use the first virtual prop when operating the first virtual character, which does not affect the control on the first virtual character by the user, consequently improving the accuracy in control of virtual characters.

A specific operation of triggering the UI control on the first UI by the first user is not limited in the present disclosure. For example, the operation may be a click, a double-click, a long press, a slide, a press, or a knock.

Figure 11:
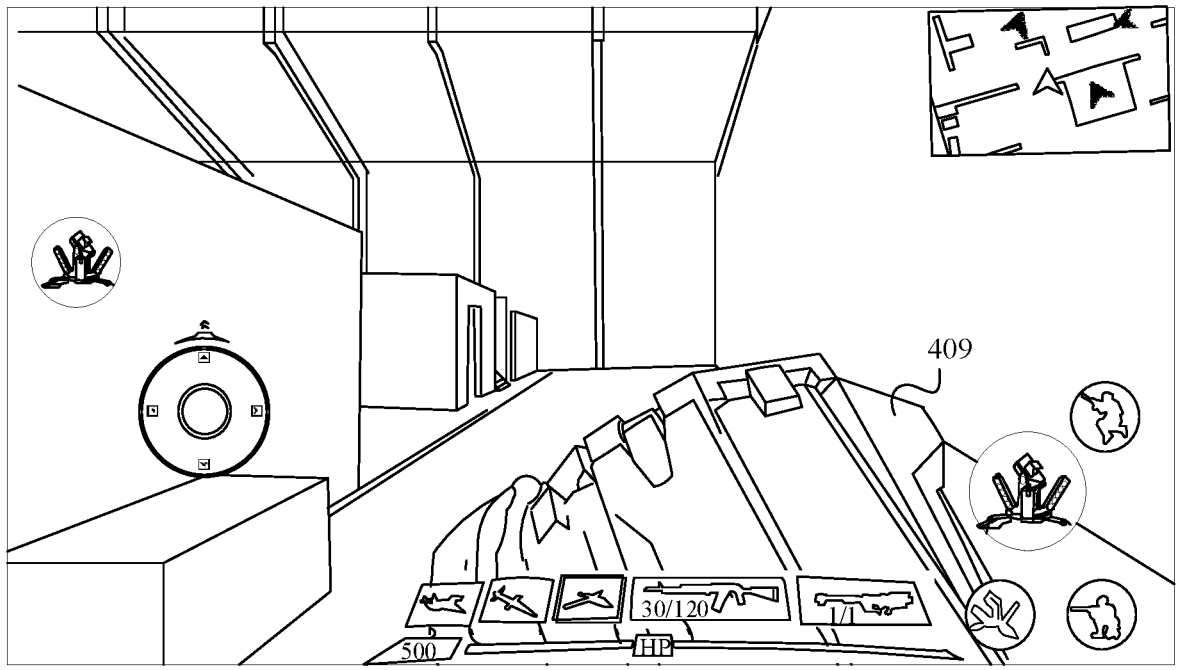
FIG. 11 is a schematic diagram of a UI in a method for using a virtual prop according to another exemplary embodiment of the present disclosure.

For example, before the first virtual character enters the virtual environment, the first user has equipped the first virtual character with the first virtual prop and a corresponding launch prop, when the first client receives an operation of the user for switching to the launch prop, the display interface of the virtual scene displays, in response to the operation, the launch prop used for launching the first virtual prop. FIG. 11 is a schematic diagram of a UI in a method for using a virtual prop according to an exemplary embodiment of the present disclosure. As shown in FIG. 11, the first UI displays a launch prop 409. The launch prop 409 is a virtual prop held by the first virtual character that is currently controlled by first user. The launch prop 409 may be displayed in a form of a launching cannon, and the user may control a throwing direction of the launch prop 409 to adjust the placement point of the first virtual prop.

Operation 2022: Determine the placement point of the first virtual prop in response to the use instruction for the first virtual prop.

In an example embodiment, the determining the placement point of the first virtual prop includes: determining a flight path of the first virtual prop, the flight path being calculated according to at least one parameter of the perspective and a position of the first virtual character, and a throwing direction, a starting point for throwing, a throwing force, and a throwing speed of the first virtual prop; and determining an end point of the flight path as the placement point.

In some embodiments, the first virtual character is currently located at a point (0, 0, 0), the starting point for throwing is a point (0, 0, 10) of a hand of the first virtual character, the throwing direction is a direction of (1, 1, 1), and the throwing speed is 5 m/s, so that the first client calculates the flight path (a parabola) of the first virtual prop according to these parameters, and determines the end point of the flight path as the placement point.

In some embodiments, the throwing direction is obtained according to a current perspective (a pitch angle and horizontal deflection angle) of the first virtual character, and the throwing speed and the throwing force are obtained according to a throwing operation of the first user. For example, the throwing force is determined according to a time length for which the first user presses a fire button, and a longer press time indicates a larger force and a farther throw. In some embodiments, the flight path of the first virtual prop can further be calculated according to parameters such as mass and a gravitational acceleration of the first virtual prop. In some embodiments, the flight path is also a straight line from the starting point for throwing to a landing point.

In some embodiments, the first virtual prop arrives at the placement point after being thrown along the flight path.

In some embodiments, the first UI displays a special effect line to show the flight path. The special effect line is a reference line displayed on the first UI to improve the accuracy of the user in controlling the first virtual character to throw the first virtual prop.

In some embodiments, the special effect line will be displayed after the first user equips the first virtual prop, and the special effect line changes with an operation of the first user in real time. For example, the special effect line changes with a movement of the position and rotation of the perspective of the first user in real time.

In some embodiments, the special effect line changes with a change of the flight path. That is, a flight path is calculated in real time with an operation of the first user, and a corresponding special effect line also changes according to a calculation result of the flight path. In some embodiments, when the first user presses the fire button, the first client calculates a flight path according to a current state (parameters) of the first virtual character, and renders and displays a special effect line according to the flight path; and when the first user releases the fire button, the first client throws the first virtual prop according to the currently calculated flight path.

In some embodiments, the first client can alternatively directly calculate several points on the flight path according to the calculation method of the flight path, directly obtain the special effect line according to these points, and then throw the first virtual prop according to the special effect line.

In some embodiments, after determining a position of the placement point of the first virtual prop, the first client detects a region in contact with the placement point. Only when the placement point is determined as an effective region, the first client will perform operation 2023.

In some embodiments, a first action effect is displayed when the placement point is an effective region, the first action effect being used for prompting that the first virtual prop is capable of being placed at the placement point.

The effective region is a region indicating the first virtual prop can be successfully placed at the placement point. For example, the effective region is land.

In some embodiments, the first action effect includes at least one of a first light circle special effect and first prompt information.

In some embodiments, a second action effect is displayed when the placement point is not the effective region, the second action effect being used for prompting that the first virtual prop is incapable of being placed at the placement point.

In some embodiments, the second action effect includes at least one of a second light circle special effect and second prompt information.

The first action effect is different from the second action effect.

In the virtual scene, developers build hitboxes to build a virtual environment, virtual characters, virtual vehicles, and the like in the virtual scene. The hitbox is a physical model used for determining situations such as an object hit and an object collision in a 3D game, and is different from an appearance model with smooth edges and meticulous workmanship, that is, the virtual environment, virtual characters, virtual vehicles, and like that are visually seen by the user. The hitbox is generally constructed with simple polygons that roughly match the appearance model, and the hitbox is invisible in the virtual environment.

After the placement point of the first virtual prop is determined, the first client obtains, from a hitbox library for building the virtual scene, a material attribute of a hitbox corresponding to the region in contact with the placement point, and determines whether the material attribute of the hitbox corresponding to the region in contact with the placement point is a preset material attribute. An example in which the preset material attribute indicates that the region in contact with the placement point is ground (that is, the effective region is land) is used. If an attribute of the hitbox corresponding to the region in contact with the placement point is the preset material attribute, it indicates that the placement point is the ground, and the placement point is an effective region; and if the attribute of the hitbox corresponding to the region in contact with the placement point is not the preset material attribute, for example, the attribute of the hitbox corresponding to the region in contact with the placement point indicates that the placement point is a water surface, the placement point is not an effective region.

In some embodiments, it is determined that the material attribute of the region in contact with the placement point is the preset material attribute, that is, the placement point is an effective region, whether an obstacle exists within a predetermined range around the placement point further needs to be determined. In some embodiments, the first client can determine whether an obstacle exists within the predetermined range around the placement point by determining whether a hitbox having some material attributes exists within the predetermined range around the placement point.

To prompt the first user with a determination result, in embodiments of the present disclosure, different action effects are respectively set for that the placement point is an effective region and the placement point is not an effective region. In some embodiments, the action effects include one or more of a light circle special effect, prompt information, or voice information. The action effects for that the placement point is an effective region and the placement point is not an effective region are different attributes of a same type, for example, light circle special effects in different colors, different prompt information, or different voice information.

Figure 12:
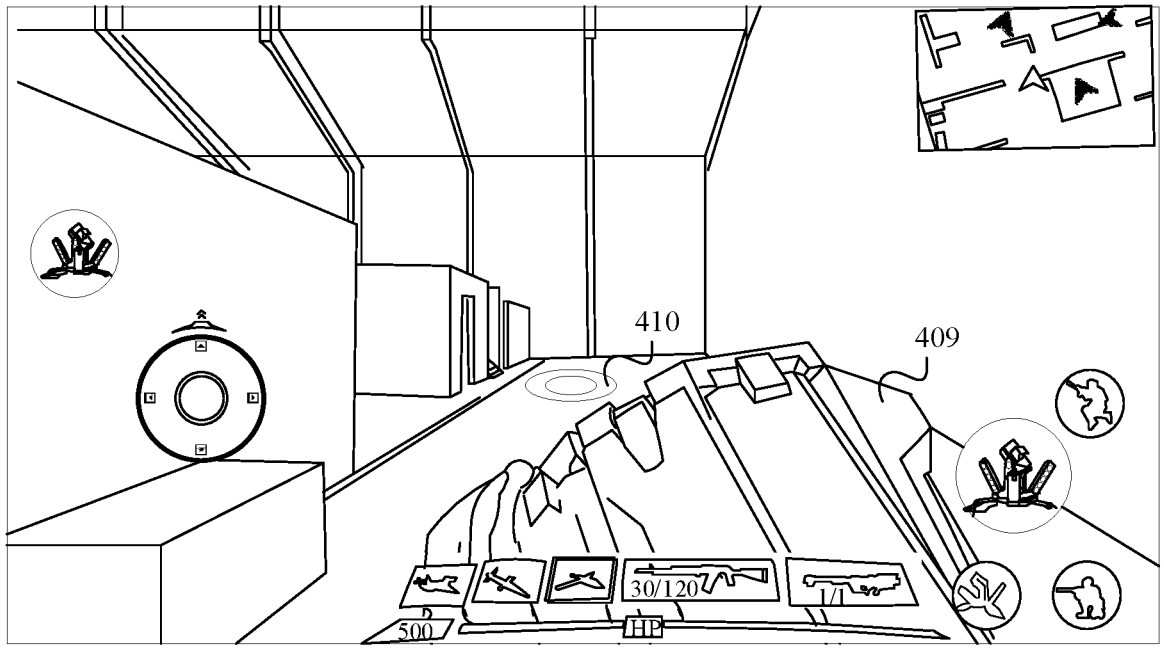
FIG. 12 is a schematic diagram showing that a placement point is an effective region according to an exemplary embodiment of the present disclosure.

FIG. 12 is a schematic diagram showing that a placement point is an effective region according to an exemplary embodiment of the present disclosure. As shown in FIG. 12, a placement point 410 is ground, then a first action effect is displayed at the placement point 410. By using an example in which the first action effect is a first light circle special effect, the first light circle special effect at the placement point 410 may be displayed as a blue light circle special effect (not shown in the figure).

Figure 13:
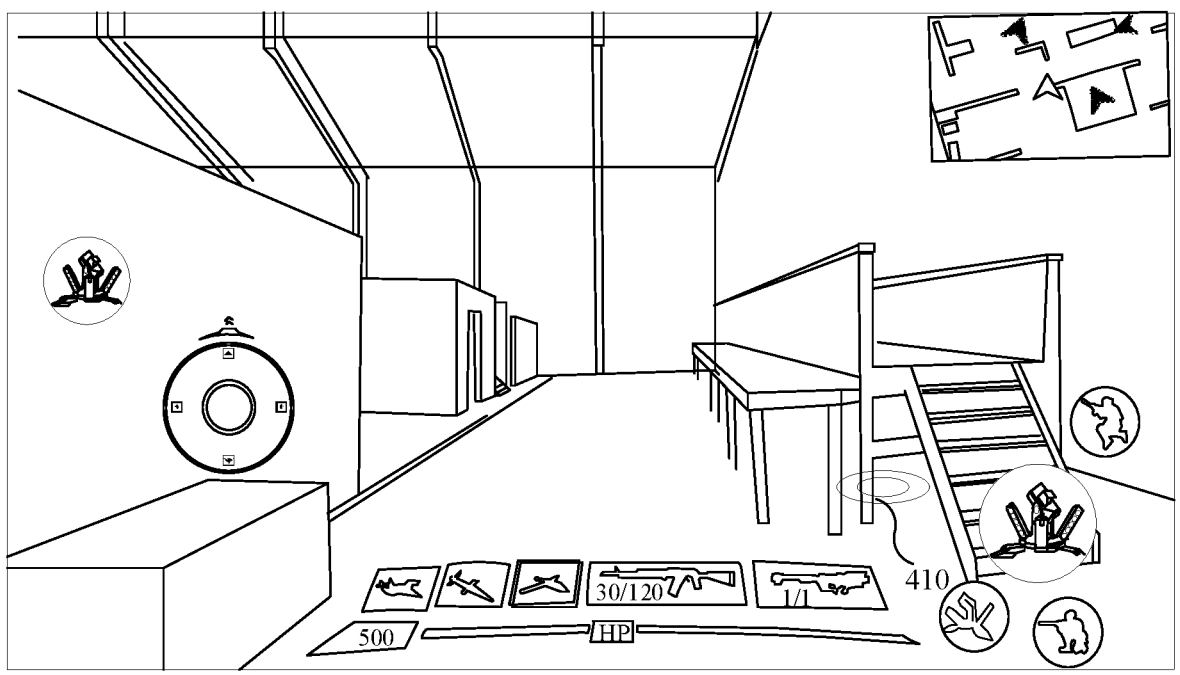
FIG. 13 is a schematic diagram showing that a placement point is not an effective region according to an exemplary embodiment of the present disclosure.

FIG. 13 is a schematic diagram showing that a placement point is not an effective region according to an exemplary embodiment of the present disclosure. As shown in FIG. 13, the placement point 410 is on a stair in a building, and is not an effective region, then a second action effect is displayed at the placement point 410. By using an example in which the second action effect is a second light circle special effect, the second light circle special effect at the placement point 410 may be displayed as a blue light circle special effect (not shown in the figure).

The above-mentioned examples for the colors of the light circle special effects are merely exemplary, and are not limited in the present application.

Operation 2023: Control the first virtual character to launch the first virtual prop to the placement point by using the launch prop.

Figure 14:
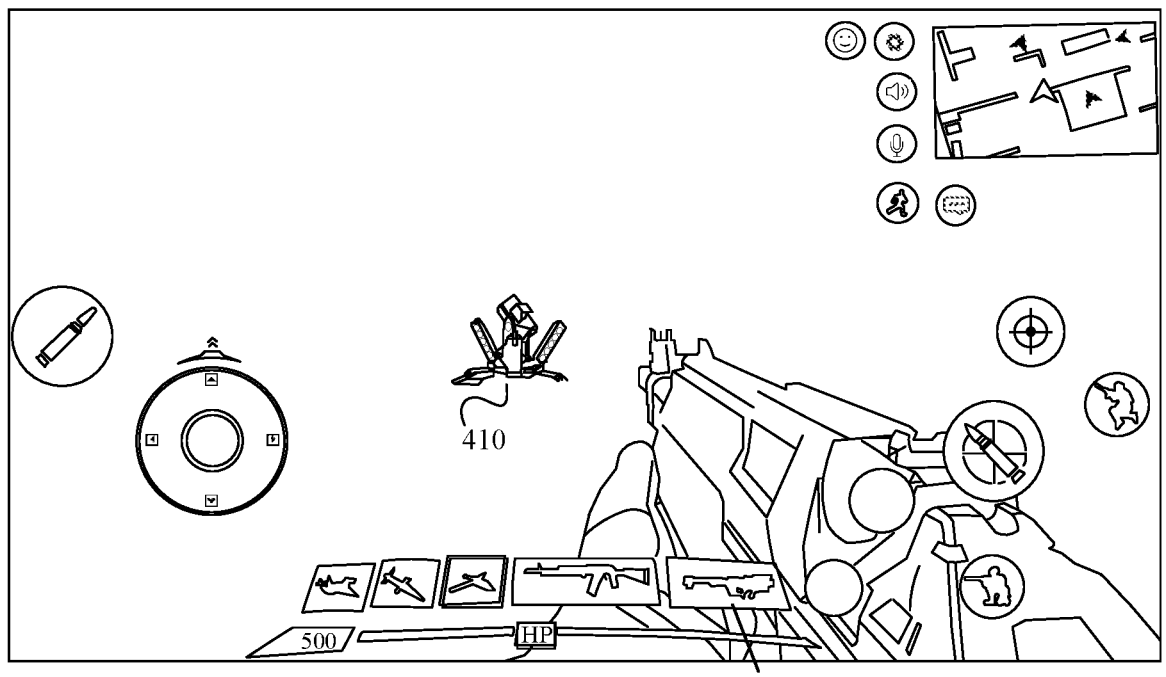
FIG. 14 is a schematic diagram of a UI in a method for using a virtual prop according to another exemplary embodiment of the present disclosure.

In some embodiments, an operation of the first user for triggering the first client to control the first virtual character to use the launch prop to enable the first virtual prop to arrive at the placement point is shown as the first user releases the fire button. In other words, when the first user switches a handheld prop of the currently controlled first virtual character to the launch prop, a placement point is detected based on a touch operation on the fire button. After determining that the placement point is an effective region, the first user releases the fire button, and activates the launch prop, to launch the first virtual prop to the placement point in the virtual scene. Referring to FIG. 14, the first virtual prop is placed at the placement point 410 in the virtual scene, and the placement point 410 is an effective region land.

After the first virtual prop is placed at the placement point, a defense range exists. The defense range is approximately considered as a sphere with the first virtual prop as a center and an effective radius as a radius.

Figure 15:
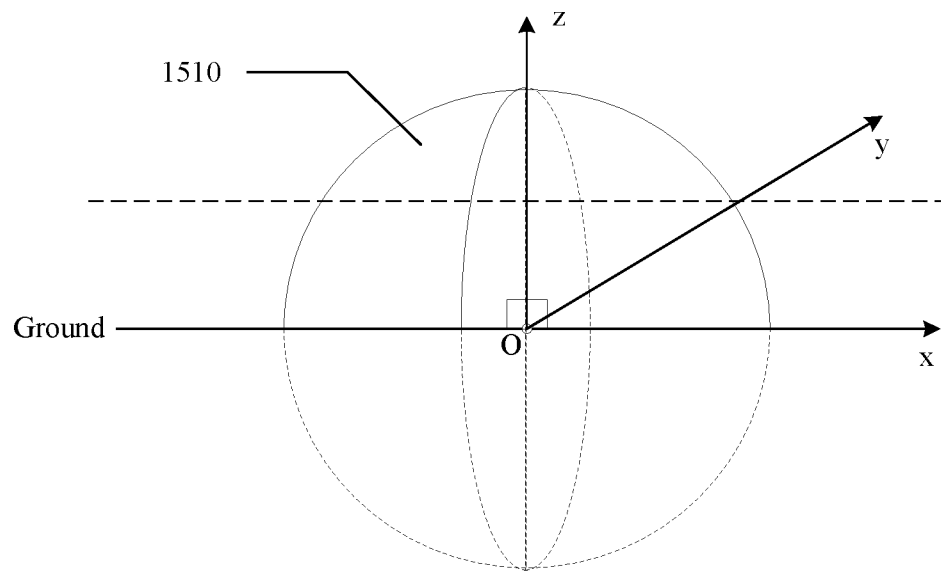
FIG. 15 is a schematic diagram of a defense range of a first virtual prop according to another exemplary embodiment of the present disclosure.

In some embodiments, some regions of the sphere have a defense effect. For example, FIG. 15 is a schematic diagram of a defense range of a first virtual prop according to an exemplary embodiment of the present disclosure. As shown in FIG. 15, a coordinate system is established by using the sphere center as an origin, and a horizontal plane at which the sphere center O is located is the ground. The developers set a range above the ground of a region covered by the sphere as the defense range, or set a partial sphere region 1510 of the sphere spaced apart from the horizontal plane in the coordinate system by a specific distance on as the defense range of the first virtual prop. If the range above the ground is the defense range, the first client controls the first virtual prop to intercept a surrounding second virtual prop (for example, a missile); and if the partial sphere region is the defense range, the first virtual prop intercepts a second virtual prop (for example, a missile) within a specific angle range.

Figure 16:
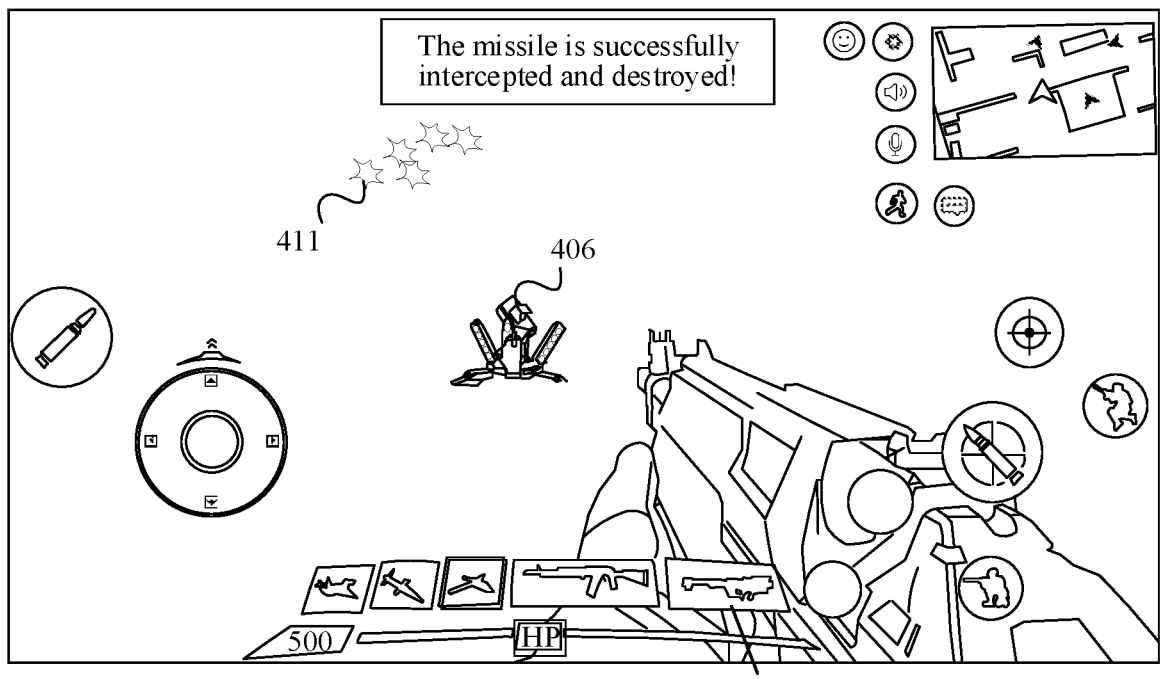
FIG. 16 is a schematic diagram of a UI in a method for using a virtual prop according to another exemplary embodiment of the present disclosure.

Referring to FIG. 16, as shown in the figure, a second virtual prop 411 is a missile. When the first virtual character uses the first virtual prop 406, and the second virtual prop 411 enters the defense range of the first virtual prop 406, the second virtual prop 411 is intercepted and destroyed, and no longer attacks the first virtual character or a second virtual character belonging to a same team as the first virtual character. Prompt information "The missile is successfully intercepted and destroyed!" indicating that the second virtual prop is intercepted is displayed on the first UI corresponding to the first virtual character.

In some embodiments, after operation 2023, the first client further performs operation 2041 or operation 2042.

Operation 2041: Destroy the first virtual prop when a quantity of intercepted second virtual props reaches a first threshold.

Operation 2042: Destroy the first virtual prop when a use duration of the first virtual prop reaches a second threshold.

In some embodiments, the defense effect of the first virtual prop has a time limit. After a period of time, the first virtual prop loses the defense effect, and no longer intercepts the second virtual prop. To determine the time limit of the defense effect of the first virtual prop, the first client can perform statistics on the quantity of intercepted second virtual props, or perform statistics on the use duration of the first virtual prop. The use duration of the first virtual prop is calculated from a time point the first virtual prop arrives at the placement point. When the time limit is reached, the first client controls the first virtual prop to be destroyed by itself, and does not continue to display the first virtual prop on the first UI.

In some embodiments, the first threshold is 3. The first client performs statistics on the quantity of the intercepted second virtual props, and when the quantity reaches 3, the first virtual prop loses the defense effect, and no longer intercepts the second virtual props. The first client controls the first virtual prop to be destroyed by itself.

In some embodiments, the second threshold is 2 minutes. The first client performs statistics on the use duration of the first virtual prop, and when the use duration reaches 2 minutes, the first virtual prop loses the defense effect, and no longer intercepts the second virtual props. The first client controls the first virtual prop to be destroyed by itself.

Based on the above, according to the method provided in an embodiment, a launch prop is provided, and placement of the first virtual prop is controlled by using the launch prop, thereby improving the accuracy of placing the first virtual prop.

According to the methods provided in the embodiments of the present disclosure, parameters such as the perspective and the position of the first virtual character, and the throwing direction, the starting point for throwing, the throwing force, and the throwing speed of the first virtual prop are provided to calculate a throwing route of the first virtual prop, so as to determine a final landing point of the first virtual prop. The user can adjust the flight path of the first virtual prop by adjusting the plurality of parameters, to obtain different landing points, consequently improving the controllability of the first virtual prop.

According to the methods provided in embodiments of the present disclosure, the placement point is detected before the first virtual prop is launched, only when the placement point is an effective region, for example, the ground, the first virtual prop can be successfully placed. By limiting the effective region in which the first virtual prop can be used, the authenticity of a shooting scene increases, further improving a sense of immersion of the user and the user experience. In addition, by providing a light circle special effect and prompt information to prompt the user whether the first virtual prop can be placed at the current placement point, the user can timely adjust the placement point, thereby improving the controllability of the first virtual prop. Further, by adjusting the placement point of the first virtual prop to an expected position of the user, the accuracy in using the first virtual prop is improved.

According to the methods provided in example embodiments, by providing two different manners of automatically destroying the first virtual prop, the fairness of the game is ensured.

Figure 17:
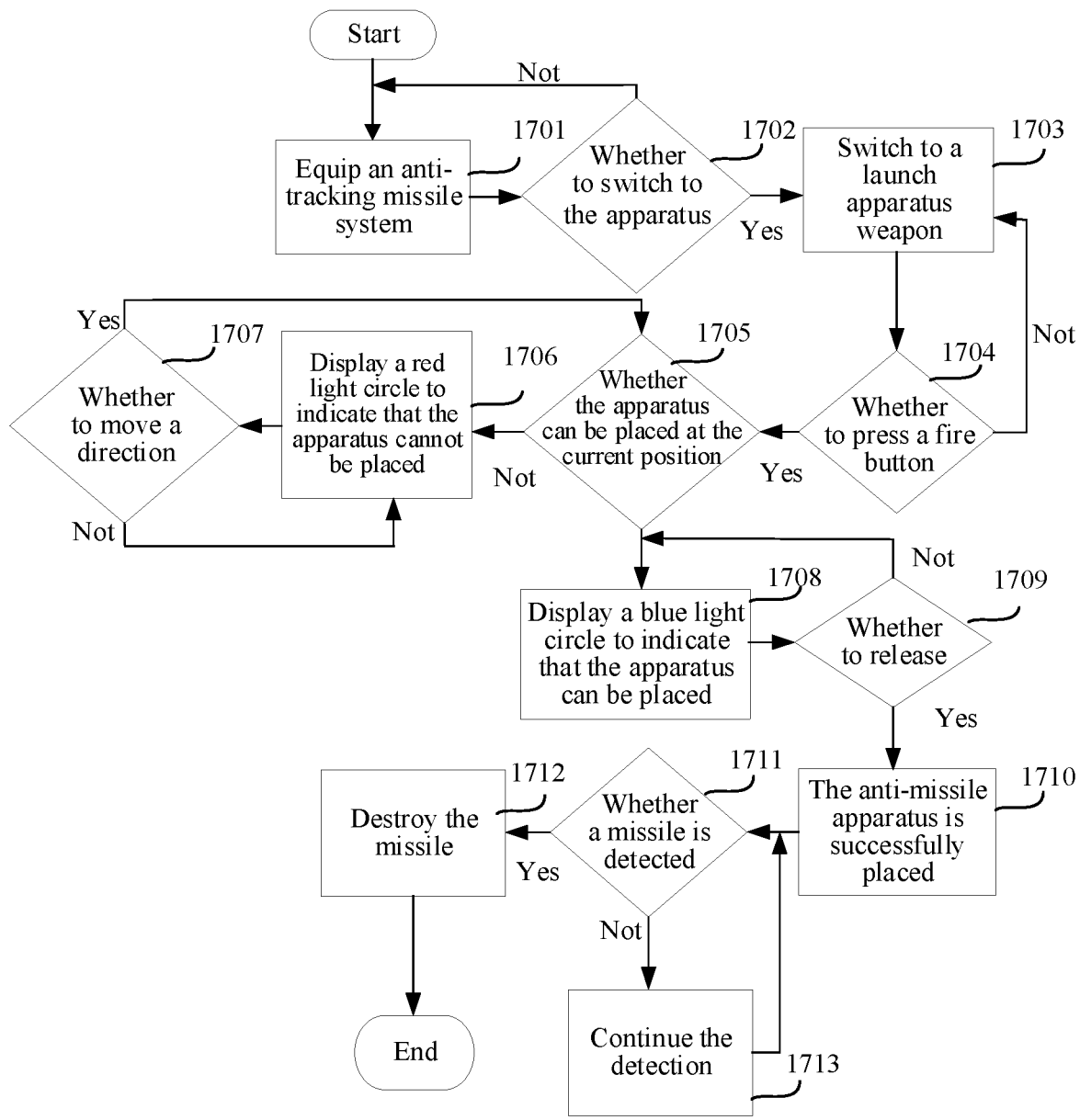
FIG. 17 is a flowchart of a method for using a virtual prop according to another exemplary embodiment of the present disclosure.

FIG. 17 is a flowchart of a method for using a virtual prop according to an exemplary embodiment of the present disclosure. The method is applicable to the first terminal 120 or the second terminal 160 in the computer system shown in FIG. 1 or another terminal in the computer system. The method includes the following operations:

Operation 1701: A first client controls a first virtual character to be equipped with an anti-tracking missile system before entering a battle.

In some embodiments, the anti-tracking missile system includes a launch apparatus weapon and an anti-missile apparatus. The anti-missile apparatus is a first virtual prop.

Operation 1702: The first client determines whether a first user has switched to the anti-tracking missile system; and if the first user has switched to the anti-tracking missile system, performs operation 1703, and otherwise, performs operation 1701.

In some embodiments, the first client determines whether the first user needs to control the first virtual character to be equipped with the anti-tracking missile system, and if the first user needs to control the first virtual character to be equipped with the anti-tracking missile system, the first client changes equipment currently owned by the first virtual character into the anti-tracking missile system.

Operation 1703: The first client switches to the launch apparatus weapon.

In some embodiments, the launch apparatus weapon is a launch prop.

Operation 1704: The first client determines whether the first user presses a fire button; and if the first user presses the fire button, performs operation 1705, and otherwise, performs operation 1703.

After the first user presses the fire button, the first client detects a placement point, and determines whether the current placement point is an effective region.

Operation 1705: The first client determines whether the anti-missile apparatus can be placed at the current position; and if the anti-missile apparatus cannot be placed, performs operation 1706, and otherwise, performs operation 1708.

Operation 1706: The first client displays a red light circle special effect to indicate that the anti-missile apparatus cannot be placed.

In some embodiments, the red light circle special effect is a second light circle special effect, and is used for prompting the first user that the anti-missile apparatus cannot be placed at the current position.

Operation 1707: The first client determines whether to move a direction; and if the direction is moved, performs operation 1705, and if the direction is not moved, performs operation 1706.

The first user may operate a movement control to adjust a moving direction of the first virtual character, so as to adjust the placement point of the first virtual prop.

Operation 1708: The first client displays a blue light circle special effect to indicate that the anti-missile apparatus can be placed.

In some embodiments, the blue light circle special effect is a first light circle special effect, and is used for prompting the first user that the anti-missile apparatus can be placed at the current position.

Operation 1709: The first client determines whether the first client releases; and if the first user releases, performs operation 1710, and otherwise, performs operation 1708.

When the first user releases the fire button, the first client throws the anti-missile apparatus according to a flight path determined during detection of the placement point.

Operation 1710: The first client successfully places the anti-missile apparatus.

After arriving at a landing point and being successfully placed, the anti-missile apparatus will protect virtual characters within a defense range.

Operation 1711: The first client determines whether a missile is detected; and if a missile is detected, performs operation 1712, and otherwise, performs operation 1713.

In some embodiments, the missile is a second virtual prop. The first client determines whether a missile is detected, and if a missile is detected, destroys the missile.

Operation 1712: The first client controls destruction of the missile.

The first client controls the missile to be destroyed when the missile enters the defense range.

Operation 1713: The first client continues the detection.

Based on the above, according to the methods provided in the embodiments, by providing a first virtual prop specially for intercepting other virtual props, when a virtual character uses the first virtual prop to a chasing-type virtual weapon, the virtual weapon is intercepted within a defense range, so that a user does not need to evade the virtual weapon through a long-time movement, preventing the user from spending an excessively long time evading the chasing-type weapon, and improving the man-machine interaction efficiency.

Apparatus embodiments of the present disclosure are described below. For details that are not described in detail in the apparatus embodiments, reference may be made to the corresponding records in the foregoing method embodiments, and details are not described herein again.

Figure 18:
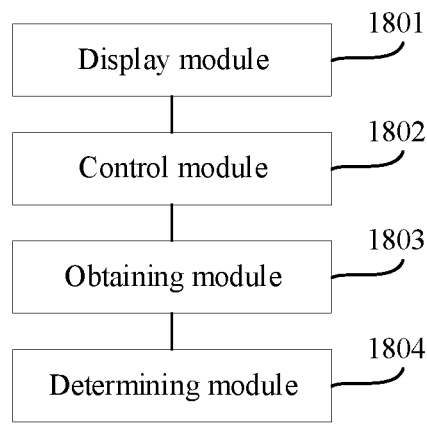
FIG. 18 is a schematic structural diagram of an apparatus for using a virtual prop according to an exemplary embodiment of the present disclosure.

FIG. 18 is a schematic structural diagram of an apparatus for using a virtual prop according to an exemplary embodiment of the present disclosure. The apparatus is implemented as all or a part of a terminal through software, hardware or a combination of the two. The apparatus includes a display module 1801 and a control module 1802, the display module 1801 being configured to display a first UI, the first UI including a first virtual environment image, the first virtual environment image being an image obtained by observing a virtual environment from a perspective of a first virtual character;

the control module 1802 being configured to control, in response to a use instruction for a first virtual prop, the first virtual character to use the first virtual prop, the first virtual prop being a virtual prop used for generating a defense range, the defense range being a range in which the first virtual prop is capable of producing a defense effect against an attack from a second virtual prop, the second virtual prop having a function of chasing a target virtual character; and the control module 1802 being configured to intercept the second virtual prop when the second virtual prop falls within the defense range.

In some embodiments, the target virtual character is at least one of the first virtual character and a second virtual character, the second virtual character and the first virtual character belonging to a same team; and the control module is configured to intercept the second virtual prop when the second virtual prop falls within the defense range and the target virtual character is located within the defense range.

In some embodiments, the control module 1802 is configured to destroy the second virtual prop; or the control module 1802 is configured to control the first virtual prop to launch a third virtual prop to shoot the second virtual prop down.

In some embodiments, the apparatus further includes an obtaining module 1803 and a determining module 1804.

The defense range includes a space range with a distance to a placement point of the first virtual prop less than an effective radius; the obtaining module 1803 is configured to obtain a position of the second virtual prop in a release process; and the determining module 1804 is configured to determine, when a distance between the placement point of the first virtual prop and the position of the second virtual prop is less than or equal to the effective radius, that the second virtual prop will fall within the defense range.

In some embodiments, the control module 1802 is configured to place, in response to a use instruction for a launch prop, the launch prop in the virtual environment, the launch prop being a virtual prop used for launching the first virtual prop; the determining module 1804 is configured to determine the placement point of the first virtual prop in response to the use instruction for the first virtual prop; and the control module 1802 is configured to control the first virtual character to launch the first virtual prop to the placement point by using the launch prop.

In some embodiments, the determining module 1804 is configured to determine a flight path of the first virtual prop, the flight path being calculated according to at least one parameter of the perspective and a position of the first virtual character, and a throwing direction, a starting point for throwing, a throwing force, and a throwing speed of the first virtual prop; and the determining module 1804 is configured to determine an end point of the flight path as the placement point.

In some embodiments, the display module 1801 is configured to display a first action effect when the placement point is an effective region, the first action effect being used for prompting that the first virtual prop is capable of being placed at the placement point; and the display module 1801 is configured to display a second action effect when the placement point is not the effective region, the second action effect being used for prompting that the first virtual prop is incapable of being placed at the placement point.

In some embodiments, the first action effect includes at least one of a first light circle special effect and first prompt information; and the second action effect includes at least one of a second light circle special effect and second prompt information, the first action effect being different from the second action effect.

In some embodiments, the control module 1802 is configured to destroy the first virtual prop when a quantity of intercepted second virtual props reaches a first threshold; or the control module 1802 is configured to destroy the first virtual prop when a use duration of the first virtual prop reaches a second threshold.

Figure 19:
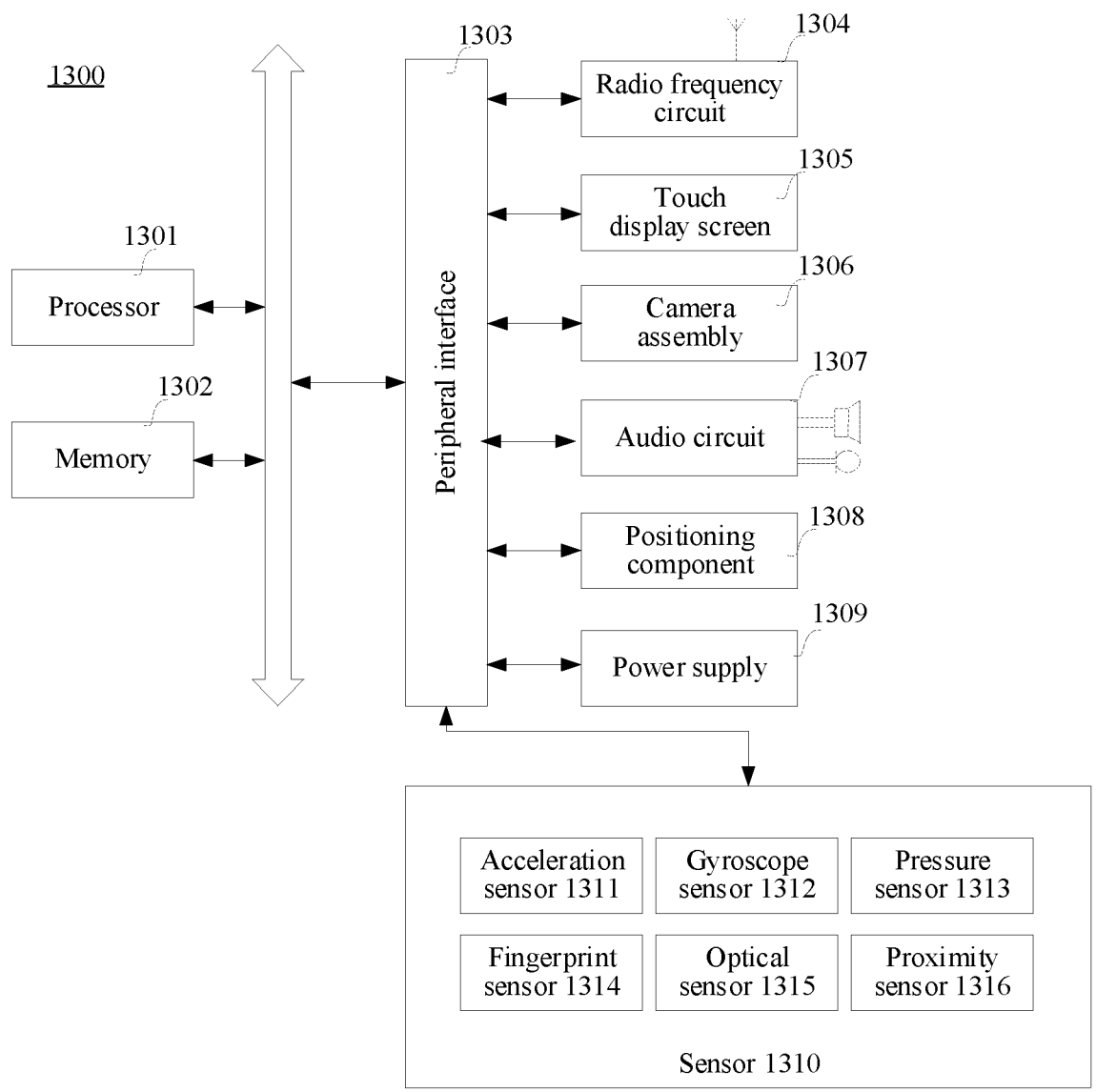
FIG. 19 is a schematic structural diagram of a computer device according to an exemplary embodiment of the present disclosure.

FIG. 19 shows a structural block diagram of a computer device 1300 according to an exemplary embodiment of the present disclosure. The computer device 1300 may be a portable mobile terminal, such as a smartphone, a tablet computer, an MP3 player, or an MP4 player. The computer device 1300 may be further referred to as another name such as user equipment or a portable terminal.

Generally, the computer device 1300 includes a processor 1301 and a memory 1302.

The processor 1301 may include one or more processing cores, for example, a 4-core processor or an 8-core processor. The processor 1301 may be implemented by using at least one hardware form of digital signal processor (DSP), a field-programmable gate array (FPGA), and a programmable logic array (PLA). The processor 1301 may alternatively include a main processor and a coprocessor. The main processor is a processor configured to process data in an awake state, also referred to as a central processing unit (CPU), and the coprocessor is a low-power processor configured to process data in a standby state. In some embodiments, the processor 1301 may be integrated with a graphics processing unit (GPU). The GPU is configured to be responsible for rendering and drawing content that a display screen needs to display. In some embodiments, the processor 1301 may further include an artificial intelligence (AI) processor. The AI processor is configured to process a calculation operation related to machine learning.

The memory 1302 may include one or more computer-readable storage media. The computer-readable storage medium may be tangible and non-transient. The memory 1302 may further include a high-speed random access memory (RAM), and a non-volatile memory such as one or more magnetic disk storage devices and a flash storage device. In some embodiments, the non-transient computer-readable storage medium in the memory 1302 is configured to store at least one instruction, and the at least one instruction is configured to be executed by the processor 1301 to implement the methods for using a virtual prop provided in the present disclosure.

In some embodiments, the electronic device 1300 may further optionally include a peripheral interface 1303 and at least one peripheral. Specifically, the peripheral includes: at least one of a radio frequency (RF) circuit 1304, a touch display screen 1305, a camera assembly 1306, an audio circuit 1307, a positioning component 1308, and a power supply 1309.

The peripheral interface 1303 may be configured to connect at least one peripheral related to input/output (I/O) to the processor 1301 and the memory 1302. In some embodiments, the processor 1301, the memory 1302, and the peripheral interface 1303 are integrated into the same chip or circuit board. In some other embodiments, any one or two of the processor 1301, the memory 1302, and the peripheral interface 1303 may be implemented on an independent chip or circuit board, and the implementation is not limited in any embodiment of the present disclosure.

The RF circuit 1304 is configured to receive and transmit an RF signal, also referred to as an electromagnetic signal. The RF circuit 1304 communicates with a communication network and another communication device by using the electromagnetic signal. The RF circuit 1304 converts an electrical signal into an electromagnetic signal for transmission, or converts a received electromagnetic signal into an electrical signal. In some embodiments, the RF circuit 1304 includes: an antenna system, an RF transceiver, one or more amplifiers, a tuner, an oscillator, a digital signal processor, a codec chip set, a subscriber identity module card, and the like. The RF circuit 1304 may communicate with another terminal by using at least one wireless communication protocol. The wireless communication protocol includes, but is not limited to, a world wide web, a metropolitan area network, an intranet, various generations of mobile communication networks (2G, 3G, 4G, and 5G), a wireless local area network and/or a wireless fidelity (Wi-Fi) network. In some embodiments, the RF circuit 1304 may further include a circuit related to a near field communication (NFC). This is not limited in the present disclosure.

The touch display screen 1305 is configured to display a UI. The UI may include a graph, text, an icon, a video, and any combination thereof. The touch display screen 1305 also has a capability of acquiring a touch signal on or above a surface of the touch display screen 1305. The touch signal may be inputted, as a control signal, to the processor 1301 for processing. The touch display screen 1305 is configured to provide a virtual button and/or a virtual keyboard, which is also referred to as a soft button and/or a soft keyboard. In some embodiments, there may be one touch display screen 1305, disposed on a front panel of the electronic device 1300. In some other embodiments, there may be at least two touch display screens 1305, respectively disposed on different surfaces of the electronic device 1300 or designed in a foldable shape. In some other embodiments, the touch display screen 1305 may be a flexible display screen, disposed on a curved surface or a folded surface of the electronic device 1300. Even, the touch display screen 1305 may be further set in a non-rectangular irregular pattern, namely, a special-shaped screen. The touch display screen 1305 may be made of a material such as a liquid crystal display (LCD) or an organic light-emitting diode (OLED).

The camera assembly 1306 is configured to acquire an image or a video. In some embodiments, the camera assembly 1306 includes a front-facing camera and a rear-facing camera. Generally, the front-facing camera is configured to implement a video call or self-portrait. The rear-facing camera is configured to capture an image or a video. In some embodiments, there are at least two rear-facing cameras, each of which is any one of a main camera, a depth of field camera and a wide-angle camera, so as to implement a background blurring function by fusing the main camera and the depth of field camera, and panoramic shooting and VR shooting functions by fusing the main camera and the wide-angle camera. In some embodiments, the camera assembly 1306 may further include a flash. The flash may be a single color temperature flash, or may be a double color temperature flash. The double color temperature flash is a combination of a warm light flash and a cold light flash, and may be used for light compensation under different color temperatures.

The audio circuit 1307 is configured to provide an audio interface between a user and the electronic device 1300. The audio circuit 1307 may include a microphone and a speaker. The speaker is configured to acquire sound waves of a user and an environment, and convert the sound waves into electric signals and input the electrical signals into the processor 1301 for processing, or input the electrical signals into the RF circuit 1304 to implement speech communication. For the purpose of stereo sound collection or noise reduction, there may be a plurality of microphones, respectively disposed at different parts of the electronic device 1300. The microphone may be further an array microphone or an omnidirectional collection microphone. The speaker is configured to convert electric signals from the processor 1301 or the RF circuit 1304 into sound waves. The speaker may be a conventional thin-film speaker, or may be a piezoelectric ceramic speaker. When the speaker is the piezoelectric ceramic speaker, electrical signals not only can be converted into sound waves that can be heard by human, but also can be converted into sound waves that cannot be heard by human for ranging and other uses. In some embodiments, the audio circuit 1307 may further include an earphone jack.

The positioning component 1308 is configured to position a current geographic location of the electronic device 1300, to implement a navigation or a location-based service (LBS). The positioning component 1308 may be a positioning component based on the Global Positioning System (GPS) of the United States, the BeiDou system of China, or the GALILEO System of the European Union.

The power supply 1309 is configured to supply power to components in the electronic device 1300. The power supply 1309 may be an alternating current, a direct current, a primary battery, or a rechargeable battery. When the power supply 1309 includes a rechargeable battery, the rechargeable battery may be a wired rechargeable battery or a wireless rechargeable battery. The wired charging battery is a battery charged through a wired line, and the wireless charging battery is a battery charged through a wireless coil. The rechargeable battery may further be configured to support a quick charge technology.

In some embodiments, the electronic device 1300 further includes one or more sensors 1310. The one or more sensors 1310 include, but are not limited to: an acceleration sensor 1311, a gyroscope sensor 1312, a pressure sensor 1313, a fingerprint sensor 1314, an optical sensor 1315, and a proximity sensor 1316.

The acceleration sensor 1311 may detect acceleration on three coordinate axes of a coordinate system established by the electronic device 1300. For example, the acceleration sensor 1311 may be configured to detect components of gravity acceleration on the three coordinate axes. The processor 1301 may control, according to a gravity acceleration signal acquired by the acceleration sensor 1311, the touch display screen 1305 to display the UI in a frame view or a portrait view. The acceleration sensor 1311 may be further configured to acquire motion data of a game or a user.

The gyroscope sensor 1312 may detect a body direction and a rotation angle of the electronic device 1300. The gyroscope sensor 1312 may cooperate with the acceleration sensor 1311 to acquire a 3D action by the user on the electronic device 1300. The processor 1301 may implement the following functions according to the data acquired by the gyroscope sensor 1312: motion sensing (such as changing the UI according to a tilt operation of the user), image stabilization at shooting, game control, and inertial navigation.

The pressure sensor 1313 may be disposed on a side frame of the electronic device 1300 and/or a lower layer of the touch display screen 1305. When the pressure sensor 1313 is disposed at the side frame of the electronic device 1300, a holding signal of the user on the electronic device 1300 may be detected, and left/right hand identification and a quick action may be performed according to the holding signal. When the pressure sensor 1313 is disposed at the lower layer of the touch display screen 1305, an operable control on the UI interface can be controlled according to a pressure operation of the user on the touch display screen 1305. The operable control includes at least one of a button control, a scroll-bar control, an icon control, and a menu control.

The fingerprint sensor 1314 is configured to acquire a user's fingerprint to identify a user's identity according to the acquired fingerprint. When identifying that the identity of the user is a trusted identity, the processor 1301 authorizes the user to perform related sensitive operations. The sensitive operations include: unlocking a screen, viewing encrypted information, downloading software, paying, changing a setting, and the like. The fingerprint sensor 1314 may be disposed on a front face, a rear face, or a side face of the electronic device 1300. When a physical button or a vendor logo is disposed on the electronic device 1300, the fingerprint sensor 1314 may be integrated together with the physical button or the vendor logo.

The optical sensor 1315 is configured to collect ambient light intensity. In an embodiment, the processor 1301 may control display brightness of the touch display screen 1305 according to the ambient light intensity acquired by the optical sensor 1315. Specifically, when the ambient light intensity is relatively high, the display brightness of the touch display screen 1305 is turned up. When the ambient light intensity is relatively low, the display brightness of the touch display screen 1305 is turned down. In another embodiment, the processor 1301 may further dynamically adjust a camera parameter of the camera assembly 1306 according to the ambient light intensity acquired by the optical sensor 1315.

The proximity sensor 1316, also referred to as a distance sensor, is generally disposed on the front surface of the electronic device 1300. The proximity sensor 1316 is configured to acquire a distance between a front face of the user and the front face of the electronic device 1300. In an embodiment, when the proximity sensor 1316 detects that the distance between the user and the front surface of the electronic device 1300 becomes smaller, the touch display screen 1305 is controlled by the processor 1301 to switch from a screen-on state to a screen-off state. When the proximity sensor 1316 detects that the distance between the user and the front surface of the electronic device 1300 becomes larger, the touch display screen 1305 is controlled by the processor 1301 to switch from the screen-off state to the screen-on state.

A person skilled in the art may understand that a structure shown in FIG. 19 constitutes no limitation on the electronic device 1300, and the electronic device may include more or fewer components than those shown in the figure, or some components may be combined, or a different component deployment may be used.

The present disclosure further provides a terminal, including a processor and a memory, the memory storing at least one computer program, the at least one computer program being loaded and executed by the processor to perform the method for using a virtual prop provided in the foregoing method embodiments.

The present disclosure further provides a computer device, including a processor and a memory, the memory storing at least one computer program, the at least one computer program being loaded and executed by the processor to perform the method for using a virtual prop provided in the foregoing method embodiments.

The present disclosure further provides a computer-readable storage medium, storing at least one computer program, the at least one computer program being loaded and executed by a processor to perform the method for using a virtual prop provided in the foregoing method embodiments.

In some embodiments, a computer program or a computer program product is further provided, including computer program code, the computer program code being stored in a computer-readable storage medium. A processor of an electronic device reads the computer program code from the computer-readable storage medium, and executes the computer program code, so that the electronic device performs the method for using a virtual prop provided in the foregoing aspects or the optional implementations of the foregoing aspects.

It is to be understood that "plurality of" mentioned in the specification means two or more. "And/or" describes an association relationship for associated objects and represents that three relationships may exist. For example, A and/or B may represent the following three cases: only A exists, both A and B exist, and only B exists. The character "/" generally indicates an "or" relationship between the associated objects.

A person of ordinary skill in the art may understand that all or some of the steps of the foregoing embodiments may be implemented by using hardware, or may be implemented by a program instructing relevant hardware. The program may be stored in a computer-readable storage medium. The storage medium may be a ROM, a magnetic disk, an optical disc, or the like.

The foregoing descriptions are merely optional embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A method for using a virtual prop, performed by a computer device, the method comprising:
    displaying a first user interface (UI), the first UI comprising a first virtual environment image, the first virtual environment image corresponding to an image of a virtual environment observed from a perspective of a first virtual character;
    controlling, in response to a use instruction for a first virtual prop, the first virtual character to use the first virtual prop;
    determining whether the first virtual prop may be placed at a region in contact with a placement point;
    controlling, based on a triggering option for the first virtual prop and a determination that the first virtual prop may be placed at the region, the first virtual character to launch the first virtual prop to the placement point using a predetermined flight path, wherein the first virtual prop is configured to intercept, within a defense range of the region, a target virtual prop configured to chase a target virtual character;
    detecting a presence of a second virtual prop that is configured to chase the first virtual character; and
    intercepting the second virtual prop based on a determination that the second virtual prop has entered the defense range.

2. The method according to claim 1,
    wherein the target virtual character is at least one of the first virtual character or a second virtual character, the second virtual character and the first virtual character belonging to a same team and
    wherein the intercepting the second virtual prop is further based on determining that the target virtual character is within the defense range.

3. The method according to claim 2, wherein the intercepting the second virtual prop further comprises:
    destroying the second virtual prop; or
    controlling the first virtual prop to launch a third virtual prop to shoot the second virtual prop down.

4. The method according to claim 2, wherein the defense range comprises a space range with a distance to the placement point of the first virtual prop less than an effective radius, and wherein the method further comprises:
    obtaining a position of the second virtual prop in a release process; and
    determining that the second virtual prop has entered the defense range based on a distance between the placement point of the first virtual prop and the position of the second virtual prop being less than or equal to the effective radius.

5. The method according to claim 1, wherein the controlling the first virtual character to use the first virtual prop comprises:
    determining the placement point of the first virtual prop in response to the use instruction for the first virtual prop.

6. The method according to claim 5, wherein the determining the placement point of the first virtual prop comprises:
    calculating the predetermined flight path according to at least one parameter of the perspective and a position of the first virtual character, and at least one of a throwing direction, a starting point for throwing, a throwing force, or a throwing speed of the first virtual prop; and
    determining an end point of the predetermined flight path as the placement point of the first virtual prop.

7. The method according to claim 5, further comprising:
    displaying a first action effect based on the placement point being an effective region, the first action effect being used for prompting that the first virtual prop is capable of being placed at the placement point; or
    displaying a second action effect based on the placement point not being the effective region, the second action effect being used for prompting that the first virtual prop is incapable of being placed at the placement point.

8. The method according to claim 7, wherein:
    the first action effect comprises at least one of a first light circle special effect or a first prompt information; and
    the second action effect comprises at least one of a second light circle special effect or a second prompt information.

9. The method of claim 1, further comprising:
    destroying the first virtual prop based on a quantity of intercepted second virtual props reaching a first threshold; or destroying the first virtual prop based on a use duration of the first virtual prop reaching a second threshold.

10. An apparatus comprising:
one or more processors; and
memory storing instructions that when executed by the one or more processors, cause the apparatus to:
display a first user interface (UI), the first UI comprising a first virtual environment image, the first virtual environment image being an image corresponding to an image of a virtual environment observed from a perspective of a first virtual character;
control, in response to a use instruction for a first virtual prop, the first virtual character to use the first virtual prop;
determine whether the first virtual prop may be placed at a region in contact with a placement point;
control, based on a triggering option for the first virtual prop and a determination that the first virtual prop may be placed at the region, the first virtual character to launch the first virtual prop to the placement point using a predetermined flight path, wherein the first virtual prop is configured to intercept, within a defense range of the region, a target virtual prop configured to chase a target virtual character;
detect a presence of a second virtual prop that is configured to chase the first virtual character; and
intercept the second virtual prop based on determining that the second virtual prop has entered the defense range.

11. The apparatus according to claim 10, wherein the target virtual character is at least one of the first virtual character or a second virtual character, the second virtual character and the first virtual character belonging to a same team, and
wherein the intercepting the second virtual prop is further based on determining that the target virtual character is within the defense range.

12. The apparatus according to claim 11, the memory further storing instructions that when executed by the one or more processors cause the apparatus to:
destroy the second virtual prop or control the first virtual prop to launch a third virtual prop to shoot the second virtual prop down.

13. The apparatus according to claim 11, wherein the defense range comprises a space range with a distance to the placement point of the first virtual prop less than an effective radius, the memory further storing instructions that when executed by the one or more processors cause the apparatus to:
position of the second virtual prop in a release process; and
determine that the second virtual prop has entered the defense range based on a distance between the placement point of the first virtual prop and the position of the second virtual prop being less than or equal to the effective radius.

14. The apparatus according to claim 13, the memory further storing instructions that when executed by the one or more processors cause the apparatus to:
determine a placement point of the first virtual prop in response to the use instruction for the first virtual prop.

15. The apparatus according to claim 14, the memory further storing instructions that when executed by the one or more processors cause the apparatus to:
calculate a flight path of the first virtual prop according to at least one parameter of the perspective and a position of the first virtual character, and at least one of a throwing direction, a starting point for throwing, a throwing force, or a throwing speed of the first virtual prop; and
determine an end point of the flight path as the placement point of the first virtual prop.

16. The apparatus according to claim 14, the memory further storing instructions that when executed by the one or more processors cause the apparatus to:
display a first action effect based on the placement point being an effective region, the first action effect being used for prompting that the first virtual prop is capable of being placed at the placement point; or
display a second action effect based on the placement point not being the effective region, the second action effect being used for prompting that the first virtual prop is incapable of being placed at the placement point.

17. The apparatus according to claim 16, wherein
the first action effect comprises at least one of a first light circle special effect or a first prompt information; and
the second action effect comprises at least one of a second light circle special effect or a second prompt information.

18. The apparatus according to claim 10, the memory further storing instructions that when executed by the one or more processors cause the apparatus to:
destroy the first virtual prop based on a quantity of intercepted second virtual props reaching a first threshold; or
destroy the first virtual prop based on a use duration of the first virtual prop reaching a second threshold.

19. A non-transitory computer-readable storage medium, storing computer-executable instructions that when executed by one or more processors, cause the one or more processors to:
display a first user interface (UI), the first UI comprising a first virtual environment image, the first virtual environment image corresponding to an image of a virtual environment observed from a perspective of a first virtual character;
control, in response to a use instruction for a first virtual prop, the first virtual character to use the first virtual prop;
determine whether the first virtual prop may be placed at a region in contact with a placement point;
control, based on a triggering option for the first virtual prop and a determination that the first virtual prop may be placed at the region, the first virtual character to launch the first virtual prop to the placement point using a predetermined flight path, wherein the first virtual prop is configured to intercept, within a defense range of the region, a target virtual prop configured to chase a target virtual character;
detect a presence of a second virtual prop that is configured to chase the first virtual character; and
intercept the second virtual prop based on determining that the second virtual prop has entered the defense range.

20. The non-transitory computer-readable storage medium of claim 19, wherein the target virtual character is at least one of the first virtual character or a second virtual character, the second virtual character and the first virtual character belonging to a same team; and
wherein the intercepting the second virtual prop is further based on determining that the target virtual character is within the defense range.

* * * * *